(12) United States Patent
Maki et al.

(10) Patent No.: US 9,016,808 B2
(45) Date of Patent: Apr. 28, 2015

(54) VEHICLE BRAKE DEVICE

(75) Inventors: Kazuya Maki, Nagoya (JP); Masayuki Naito, Aichi-gun (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 166 days.

(21) Appl. No.: 13/638,404

(22) PCT Filed: Mar. 30, 2011

(86) PCT No.: PCT/JP2011/058060
§ 371 (c)(1),
(2), (4) Date: Sep. 28, 2012

(87) PCT Pub. No.: WO2011/125757
PCT Pub. Date: Oct. 13, 2011

(65) Prior Publication Data
US 2013/0020858 A1    Jan. 24, 2013

(30) Foreign Application Priority Data
Mar. 31, 2010   (JP) .................... 2010-083245

(51) Int. Cl.
*B60T 8/64*   (2006.01)
*B60T 7/04*   (2006.01)
(Continued)

(52) U.S. Cl.
CPC ............... *B60T 7/042* (2013.01); *B60K 6/445* (2013.01); *B60T 1/10* (2013.01); *B60T 8/38* (2013.01);
(Continued)

(58) Field of Classification Search
CPC ... B60T 8/4872; B60T 11/165; B60T 13/143; B60T 13/162; B60W 30/18127
USPC ................. 303/3, 14, 151, 152, 155; 903/947
See application file for complete search history.

(56) References Cited

U.S. PATENT DOCUMENTS 5,851,057 A * 12/1998 Terazawa et al. ............. 303/155
6,345,869 B1 * 2/2002 Matsuo et al. ............. 303/116.1
(Continued)

FOREIGN PATENT DOCUMENTS

| CN | 101049825 A | 10/2007 |
|---|---|---|
| CN | 101274623 A | 10/2008 |
| JP | 63-94862 U | 6/1988 |
| JP | 2005-231547 A | 9/2005 |
| JP | 2008-222031 A | 9/2008 |
| JP | 4234033 B2 | 3/2009 |

(Continued)

OTHER PUBLICATIONS

Office Action issued on Jul. 14, 2014, by the Chinese Patent Office in corresponding Chinese Patent Application No. 201180015921.X. (5 pages).
(Continued)

*Primary Examiner* — Thomas Irvin
(74) *Attorney, Agent, or Firm* — Buchanan Ingersoll & Rooney PC

(57) ABSTRACT

In a vehicle brake device, a port is provided at a hydraulic chamber of a master cylinder and communicates with a reservoir tank. A piston movable in the hydraulic chamber for closing the port is provided with at least one piston-side port that faces on the port when at a first position. When a brake pedal is stepped on from a retracted state to move the piston from the first position to a second position spaced from the first position by a predetermined distance, the hydraulic chamber is blocked from the communication with the reservoir tank. The at least one piston-side port is provided therein with an orifice, so that the hydraulic pressure in the hydraulic chamber is raised at the time of a quick stepping of the brake pedal but is allowed to flow to the reservoir tank without being raised at the time of a non-quick stepping.

10 Claims, 14 Drawing Sheets

(51) Int. Cl.

| | |
|---|---|
| *B60K 6/445* | (2007.10) |
| *B60T 1/10* | (2006.01) |
| *B60T 8/38* | (2006.01) |
| *B60T 8/48* | (2006.01) |
| *B60T 13/68* | (2006.01) |
| *B60W 10/08* | (2006.01) |
| *B60W 10/188* | (2012.01) |
| *B60W 30/18* | (2012.01) |
| *B60T 8/32* | (2006.01) |
| *B60T 8/40* | (2006.01) |
| *B60W 20/00* | (2006.01) |

(52) U.S. Cl.
CPC ............. *B60T 8/4872* (2013.01); *B60T 13/686* (2013.01); *B60T 2201/03* (2013.01); *B60T 2270/604* (2013.01); *B60W 10/08* (2013.01); *B60W 10/188* (2013.01); *B60W 20/00* (2013.01); *B60W 30/18127* (2013.01); *Y02T 10/6239* (2013.01); *B60T 8/3275* (2013.01); *B60T 8/4086* (2013.01)

(56) References Cited

U.S. PATENT DOCUMENTS

| | | | |
|---|---|---|---|
| 7,530,649 B2 * | 5/2009 | Kusano | 303/151 |
| 2002/0014379 A1 * | 2/2002 | Oka et al. | 188/151 R |
| 2004/0108770 A1 * | 6/2004 | Maki | 303/116.4 |
| 2005/0231028 A1 * | 10/2005 | Tsubouchi et al. | 303/115.1 |
| 2005/0236892 A1 * | 10/2005 | Kusano | 303/116.1 |
| 2005/0269875 A1 | 12/2005 | Maki et al. | |
| 2006/0214504 A1 | 9/2006 | Kusano | |
| 2013/0020859 A1 | 1/2013 | Maki | |
| 2013/0134768 A1 * | 5/2013 | Ito et al. | 303/3 |
| 2014/0008965 A1 * | 1/2014 | Ito et al. | 303/3 |

FOREIGN PATENT DOCUMENTS

| | | |
|---|---|---|
| JP | 2009-286170 A | 12/2009 |
| JP | 4415379 B2 | 2/2010 |

OTHER PUBLICATIONS

International Search Report (PCT/ISA/210) issued on Jun. 28, 2011, by the Japanese Patent Office as the International Searching Authority for International Application No. PCT/JP2011/058060.

* cited by examiner

VEHICLE BRAKE DEVICE

TECHNICAL FIELD

The present invention relates to a vehicle brake device in which a target brake force applied to a vehicle in dependence on a brake manipulation state is attained by a hydraulic brake force by a hydraulic brake device and a regenerative brake force by a regenerative brake device.

BACKGROUND ART

Heretofore, as vehicle brake devices, there is known a vehicle brake device provided with a hydraulic brake device that generates a base hydraulic pressure by a master cylinder in dependence on the stepping-on of a brake pedal and that applies the generated base hydraulic pressure directly to wheel cylinders of respective wheels which are in communication with the master cylinder through oil passages with hydraulic control valves provided thereon, to make the respective wheels generate a base hydraulic brake force corresponding to the base hydraulic pressure, and a regenerative brake force that makes some of the wheels generate a regenerative brake force. In the known vehicle brake device, the hydraulic brake device and the regenerative brake device are brought into cooperative operations to apply a vehicle brake force corresponding to the manipulation state of the brake pedal, to the vehicle based on the base hydraulic brake force and the regenerative brake force.

In the vehicle brake device, a port provided at a hydraulic chamber of the master cylinder and communicating with a reservoir tank is provided at a second position which is spaced from a first position where a closing end of a piston for closing the port is placed in a stepping-on start state being the stepping-on start state of the brake pedal, by a predetermined distance in a pressure increasing direction of the piston. The vehicle brake device is provided with a base hydraulic brake force generation restricting means for restricting the generation of the base hydraulic brake force while the closing end of the piston moves from the first position to the second position at the time of the stepping-on of the brake pedal, but for releasing the restriction on the generation of the base hydraulic brake force when the closing end of the piston moves beyond the second position.

In the vehicle brake device, the second position is provided based on a maximum regenerative brake force the regenerative brake device is able to generate. The vehicle brake device is constructed so that when the closing end of the piston is between the first position and the second position, a vehicle brake force corresponding to the manipulation state of the brake pedal is applied to the vehicle only by the regenerative brake force generated by the regenerative brake device, that when the closing end of the piston is at the second position, a vehicle brake force corresponding to the manipulation state of the brake pedal is applied to the vehicle by the maximum regenerative brake force the regenerative brake device is able to generate, and that when the closing end of the piston resides beyond the second position, a vehicle brake force corresponding to the manipulation state of the brake pedal is applied to the vehicle by the hydraulic brake force generated by the hydraulic brake device and the regenerative brake force generated by the regenerative brake device.

PRIOR ART DOCUMENT

Patent Document

Patent Document 1: JP 4415379 B

SUMMARY OF THE INVENTION

Problem to be Solved by the Invention

In the vehicle brake device described in the aforementioned patent document 1, when the brake pedal is stepped on non-quickly not being quickly (when stepped on at an ordinary stepping-on speed), it is possible to attain high regenerative efficiency, namely, high fuel efficiency by positively utilizing the regenerative brake force in a low pedal pressure area in which the closing end of the piston moves from the first position to the second position. However, there is a demand that at the time of a quick stepping of the brake pedal, the base hydraulic brake force be applied as early as possible rather than attaching high regenerative efficiency/high fuel efficiency.

The present invention has been made for solving the aforementioned problem, and an object thereof is to realize, in a vehicle brake device, the coexistence of attaining high regenerative efficiency and high fuel efficiency by positively utilizing a regenerative brake force in a low pedal pressure area in which a brake pedal is moved from a stepping-on start point of time to a predetermined state, with applying a base hydraulic brake force as early as possible when the brake pedal is stepped on quickly.

Solution to the Problem

In order to solve the foregoing problem, the structural feature of the invention according to a first aspect resides in that in a vehicle brake device which comprises a hydraulic brake device that generates a base hydraulic pressure by a master cylinder in dependence on the stepping-on of a brake pedal and that applies the generated base hydraulic pressure directly to wheel cylinders of respective wheels connected to the master cylinder through oil passages provided with hydraulic control valves thereon, to make the respective wheels generate a base hydraulic brake force corresponding to the base hydraulic pressure; and a regenerative brake device that makes some of the wheels generate a regenerative brake force; wherein the hydraulic brake device and the regenerative brake device are brought into cooperative operations to apply a vehicle brake force corresponding to the manipulation state of the brake pedal, to a vehicle based on the base hydraulic brake force and the regenerative brake force; wherein a port provided at a hydraulic chamber of the master cylinder and communicating with a reservoir tank is provided at a second position that is separated from a first position where a closing end of a piston for closing the port is placed in a stepping-on start state being a stepping-on start state of the brake pedal, by a predetermined distance in a pressure increasing direction of the piston; and wherein at the time of the stepping-on of the brake pedal, the hydraulic chamber of the master cylinder is made to communicate with the reservoir tank until the closing end of the piston moves from the first position to the second position, and the hydraulic chamber of the master cylinder is closed against the reservoir tank when the closing end of the piston is beyond the second position; the port is provided with an orifice that is configured to restrict the flow of brake fluid from the master cylinder to the reservoir tank at the time of a quick stepping of the brake pedal but not to restrict the flow at the time of a non-quick stepping.

The structural feature of the invention according to a second aspect resides in that in a vehicle brake device which comprises a hydraulic brake device that generates a base hydraulic pressure by a master cylinder in dependence on the stepping-on of a brake pedal and that applies the generated base hydraulic pressure directly to wheel cylinders of respective wheels connected to the master cylinder through oil passages provided with hydraulic control valves thereon, to make the respective wheels generate a base hydraulic brake force corresponding to the base hydraulic pressure; and a regenerative brake device that makes some of the wheels generate a regenerative brake force; wherein the hydraulic brake device and the regenerative brake device are brought into cooperative operations to apply a vehicle brake force corresponding to the manipulation state of the brake pedal, to a vehicle based on the base hydraulic brake force and the regenerative brake force; wherein the hydraulic chamber of the master cylinder is provided with a master cylinder-side port being in communication with a reservoir tank; wherein a piston being slidden in the hydraulic chamber is provided with a first piston-side port facing on the master cylinder-side port and a second piston-side port separated from the first piston-side port by a predetermined distance in a pressure increasing direction of the piston and facing on the master cylinder-side port; wherein before the stepping-on of the brake pedal, the hydraulic chamber is in communication with the reservoir tank through the first piston-side port and the second piston-side port; wherein with the stepping-on start of the brake pedal, the hydraulic chamber is blocked from the communication with the reservoir tank through the second piston-side port; wherein while the brake pedal is moved from the stepping-on start by the predetermined distance in the pressure increasing direction, the hydraulic chamber is kept to communicate with the reservoir tank through the first piston-side port; and wherein when the piston moves beyond the predetermined distance, the hydraulic chamber is blocked from the communication with the reservoir tank through the first piston-side port and the second piston-side port; the first piston-side port is provided with an orifice that is configured to restrict the flow of brake fluid from the master cylinder to the reservoir tank at the time of a quick stepping of the brake pedal but not to restrict the flow at the time of a non-quick stepping.

The structural feature of the invention according to a third aspect resides in that in a vehicle brake device which comprises a hydraulic brake device that generates a base hydraulic pressure by a master cylinder in dependence on the stepping-on of a brake pedal and that applies the generated base hydraulic pressure directly to wheel cylinders of respective wheels connected to the master cylinder through oil passages provided with hydraulic control valves thereon, to make the respective wheels generate a base hydraulic brake force corresponding to the base hydraulic pressure; and a regenerative brake device that makes some of the wheels generate a regenerative brake force; wherein the hydraulic brake device and the regenerative brake device are brought into cooperative operations to apply a vehicle brake force corresponding to the manipulation state of the brake pedal, to a vehicle based on the base hydraulic brake force and the regenerative brake force; wherein a second port facing on a first port, provided at a hydraulic chamber of the master cylinder and communicating with a reservoir tank, and provided in a piston slidden in the hydraulic chamber is provided at a position that is separated from a closing end of the first port by a predetermined distance in a pressure reducing direction of the piston when the piston is at a first position placed in a stepping-on start state being a stepping-on start state of the brake pedal; and wherein the hydraulic chamber of the master cylinder is in communication with the reservoir tank through the first port and the second port while the brake pedal is stepped on to move the piston from the first position to a second position that is separated by the predetermined distance in the pressure increasing direction of the piston, and the hydraulic chamber of the master cylinder is closed against the reservoir tank when the piston is beyond the second position; the second port is provided with an orifice that is configured to restrict the flow of brake fluid from the master cylinder to the reservoir tank at the time of a quick stepping of the brake pedal but not to restrict the flow at the time of a non-quick stepping.

The structural feature of the invention according to a fourth aspect resides in that in claim 1, the vehicle brake device is provided with a brake assist device; and that the brake assist device is constructed so that at the time of the quick stepping of the brake pedal, a brake assist begins when the closing end of the piston is between the first position and the second position.

The structural feature of the invention according to a fifth aspect resides in that in claim 2, the vehicle brake device is provided with a brake assist device; and that the brake assist device is constructed so that at the time of the quick stepping of the brake pedal, a brake assist begins within the period that the brake pedal is moved from the stepping-on start by the predetermined distance in the pressure increasing direction.

The structural feature of the invention according to a sixth aspect resides in that in claim 3, the vehicle brake device is provided with a brake assist device; and that the brake assist device is constructed so that at the time of the quick stepping of the brake pedal, a brake assist begins when the piston is between the first position and the second position.

The structural feature of the invention according to a seventh aspect resides in that in claim 1 or 4, the brake pedal is provided with a reaction force spring that builds a pedal reaction force against the brake pedal while the closing end of the piston moves from the first position to the second position; and that the reaction force spring is connected to a bracket fixed to a vehicle body at its one end and urges the brake pedal in a stepping-on release direction being an opposite direction to the stepping-on direction.

The structural feature of the invention according to an eighth aspect resides in that in claim 2 or 5, the brake pedal is provided with a reaction force spring that builds a pedal reaction force against the brake pedal while the brake pedal is moved from the stepping-on start by the predetermined distance in the pressure increasing direction; and that the reaction force spring is connected to a bracket fixed to a vehicle body at its one end and urges the brake pedal in a stepping-on release direction being an opposite direction to the stepping-on direction.

The structural feature of the invention according to a ninth aspect resides in that in claim 3 or 6, the brake pedal is provided with a reaction force spring that builds a pedal reaction force against the brake pedal while the piston moves from the first position to the second position; and that the reaction force spring is connected to a bracket fixed to a vehicle body at its one end and urges the brake pedal in a stepping-on release direction being an opposite direction to the stepping-on direction.

The structural feature of the invention according to a tenth aspect resides in that in any one of claims 7 to 9, the characteristic of a load to the deformation of the reaction force spring is non-linear in the state that the master cylinder and the reservoir tank are in communication through the port.

The structural feature of the invention according to an eleventh aspect resides in that in claim 10, the characteristic of a load to the deformation of the reaction force spring is linear in the state that the master cylinder and the reservoir tank are out of communication, wherein the increase of the load to the increase of the deformation in the linear characteristic is equal to, or less than, the increase of the load to the increase of the deformation in the non-linear characteristic.

Effects of the Invention

In the invention according to the first aspect as constructed above, at the time of the non-quick stepping of the brake pedal, the flow of brake fluid from the master cylinder to the reservoir tank is not restricted by the orifice provided in the port. Therefore, the generation of the base hydraulic brake force is restricted while the closing end of the piston moves from the first position to the second position. Thus, when the drive steps on the brake pedal, the base hydraulic brake force is forcibly restricted to a predetermined value or less with the closing end of the piston residing between the first position and the second position. Further, during this period, in a cooperative operation with the hydraulic brake device to attain a vehicle brake force corresponding to the brake manipulation state, the regenerative brake device supplements the deficiency in the base hydraulic brake force relative to the vehicle brake force by the regenerative brake force, so that high regenerative efficiency, namely, high fuel efficiency can be attained.

Where the second position is provided based on the maximum regenerative brake force which the regenerative brake device is able to generate, as the construction that supplements the deficiency in the base hydraulic brake force by the regenerative brake force, it is conceived to apply to the vehicle the vehicle brake force corresponding to the manipulation state of the brake pedal, only by the regenerative brake force generated by the regenerative brake device when the closing end of the piston resides between the first position and the second position; to apply to the vehicle the vehicle brake force corresponding to the manipulation state of the brake pedal, by the maximum regenerative brake force being able to be generated by the regenerative brake device when the closing end of the piston is at the second position; and to apply to the vehicle the vehicle brake force corresponding to the manipulation state of the brake pedal, by the base hydraulic brake force generated by the hydraulic brake device and the regenerative brake force generated by the regenerative brake device when the closing end of the piston resides at a position beyond the second position.

At the time of the quick stepping of the brake pedal, on the other hand, the flow of brake fluid from the master cylinder to the reservoir tank is restricted by the orifice provided in the port. Therefore, the back pressure is increased to cause the master cylinder to build a base hydraulic pressure in the hydraulic chamber, and hence, it is possible to generate the base hydraulic brake force before the port is closed by the piston, that is, while the closing end of the piston moves from the first position to the second position. Thus, when the driver steps on the brake pedal, it is possible to positively generate the base hydraulic brake force with the closing end of the piston residing between the first position and the second position, and hence, in the low pedal pressure area in which the closing end of the piston is between the first position and the second position, the early application of the base hydraulic brake force can be realized in preference to high regenerative efficiency/high fuel efficiency.

As described above, in the vehicle brake device, in the low pedal pressure area in which the brake pedal is moved from the stepping-on start point of time to the predetermined state, it is possible to realize the coexistence of attaining high regenerative efficiency and high fuel efficiency by positively utilizing the regenerative brake force at the time of the non-quick stepping, with applying the base hydraulic brake force as early as possible at the time of the quick stepping.

In the invention according to the second aspect as constructed above, at the time of the non-quick stepping of the brake pedal, the flow of brake fluid from the master cylinder to the reservoir tank is not restricted by the orifice provided in the first piston-side port. Therefore, the generation of the base hydraulic brake force is restricted while the brake pedal is moved from the stepping-on start by the predetermined distance in the pressure increasing direction. Accordingly, similarly to the invention according to claim 1, during this period, it is possible to attain high regenerative efficiency and high fuel efficiency by positively utilizing the regenerative brake force.

At the time of the quick stepping of the brake pedal, on the other hand, the flow of brake fluid from the master cylinder to the reservoir tank is restricted by the orifice provided in the first piston-side port. Therefore, because the back pressure in the first piston-side port increases, it is possible to generate the base hydraulic brake force before the first piston side-portion is closed, that is, within the period that the brake pedal is moved from the stepping-on start by the predetermine distance in the pressure increasing direction. Accordingly, similarly to the invention according to claim 1, during this period, it is possible to apply the base hydraulic brake force as early as possible in preference to high regenerative efficiency/high fuel efficiency at the time of the quick stepping of the brake pedal.

As described above, in the vehicle brake device, in the low pedal pressure area in which the brake pedal is moved from the stepping-on start point of time to the predetermined state, it is possible to realize the coexistence of attaining high regenerative efficiency and high fuel efficiency by positively utilizing the regenerative brake force at the time of the non-quick stepping, with applying the base hydraulic brake force as early as possible at the time of the quick stepping.

In the invention according to the third aspect as constructed above, at the time of the non-quick stepping of the brake pedal, the flow of brake fluid from the master cylinder to the reservoir tank is not restricted by the orifice provided in the second port. Therefore, the generation of the base hydraulic brake force is restricted while the piston moves from the first position to the second position. For example, where the second position is provided based on the maximum regenerative brake force being able to be generated by the regenerative brake device, the vehicle brake force corresponding to the manipulation state of the brake pedal is applied to the vehicle only by the regenerative brake force generated by the regenerative brake device when the piston is between the first position and the second position, the vehicle brake force corresponding to the manipulation state of the brake pedal is applied to the vehicle by the maximum regenerative brake force being able to be generated by the regenerative brake device when the piston resides at the second position, and the vehicle brake force corresponding to the manipulation state of the brake pedal is applied to the vehicle by the base hydraulic brake force generated by the hydraulic brake device and the regenerative brake force generated by the regenerative brake device when the piston resides at a position beyond the second position. Accordingly, similarly to the invention according to claim 1, it results that in the low pedal pressure area that the piston is at the first position to the second position, the regenerative brake force is positively utilized thereby to achieve high regenerative efficiency, namely, high fuel efficiency.

At the time of the quick stepping of the brake pedal, on the other hand, the flow of brake fluid from the master cylinder to the reservoir tank is restricted by the orifice provided in the second port. Thus, the back pressure in the second port increases, and this makes it possible to generate the base hydraulic brake force before the second port is closed by the closing end of the first port, that is, while the piston is at the first position to the second position. Accordingly, similarly to the invention according to claim 1, in the low pedal pressure area that the piston is at the first position to the second position, it can be realized to early apply the base hydraulic brake force at the time of the quick stepping of the brake pedal in preference to high regenerative efficiency/high fuel efficiency.

As described above, in the vehicle brake device, in the low pedal pressure area in which the brake pedal is moved from the stepping-on start point of time to the predetermined state, it is possible to realize the coexistence of attaining high regenerative efficiency and high fuel efficiency by positively utilizing the regenerative brake force at the time of the non-quick stepping, with applying the base hydraulic brake force as early as possible at the time of the quick stepping.

In the invention according to the fourth aspect as constructed above, in claim 1, the vehicle brake device is provided with the brake assist device, and the brake assist device is constructed so that at the time of the quick stepping of the brake pedal, a brake assist begins when the piston is between the first position and the second position. Thus, in the low pedal pressure area that the closing end of the piston is at the first position to the second position, the early application of the base hydraulic brake force can reliably be realized by the brake assist device at the time of the quick stepping of the brake pedal.

In the invention according to the fifth aspect as constructed above, in claim 2, the vehicle brake device is provided with the brake assist device, and the brake assist device is constructed so that at the time of the quick stepping of the brake pedal, a brake assist begins within the period that the brake pedal is moved from the stepping-on start position by the predetermined distance in the pressure increasing direction. Thus, in the low pedal pressure area that the brake pedal is moved from the stepping-on start position by the predetermined distance in the pressure increasing direction, the early application of the base hydraulic brake force can reliably be realized by the brake assist device at the time of the quick stepping of the brake pedal.

In the invention according to the sixth aspect as constructed above, in claim 3, the vehicle brake device is provided with the brake assist device, and the brake assist device is constructed so that at the time of the quick stepping of the brake pedal, a brake assist begins when the piston is between the first position and the second position. Thus, in the low pedal pressure area that the piston is at the first position to the second position, the early application of the base hydraulic brake force can reliably be realized by the brake assist device at the time of the quick stepping of the brake pedal.

In the invention according to the seventh aspect as constructed above, in claim 1 or 4, the brake pedal is provided with the reaction force spring that builds the pedal reaction force against the brake pedal while the closing end of the piston is at the first position to the second position. The reaction force spring is connected at its one end to the bracket fixed on the vehicle body and urges the brake pedal in the stepping-on release direction being the opposite direction to the stepping-on direction. Thus, while the brake pedal is stepped on to cause the closing end of the piston to reside at the first position to the second position, it is possible to give the driver a favorable pedal feeling by the urging force of the reaction force spring.

In the invention according to the eighth aspect as constructed above, in claim 2 or 5, the brake pedal is provided with the reaction force spring that builds the pedal reaction force against the brake pedal while the brake pedal is moved from the stepping-on start by the predetermined distance in the pressure increasing direction. The reaction force spring is connected at its one end to the bracket fixed on the vehicle body and urges the brake pedal in the stepping-on release direction being the opposite direction to the stepping-on direction. Thus, while the brake pedal is moved from the stepping-on start by the predetermined distance in the pressure increasing direction, it is possible to give the driver a favorable pedal feeling by the urging force of the reaction force spring.

In the invention according to the ninth aspect as constructed above, in claim 3 or 6, the brake pedal is provided with the reaction force spring that builds the pedal reaction force against the brake pedal while the piston moves from the first position to the second position. The reaction force spring is connected at its one end to the bracket fixed on the vehicle body and urges the brake pedal in the stepping-on release direction being the opposite direction to the stepping-on direction. Thus, while the stepping-on of the brake pedal cause the piston to move from the first position to the second position, it is possible to give the driver a favorable pedal feeling by the urging force of the reaction force spring.

At the time of the non-quick stepping, no brake pedal reaction force by the master cylinder pressure can be obtained in the state that the master cylinder and the reservoir tank are in communication through the port. Further, generally, the characteristic (F-S characteristic) of the stepping force to the stepping amount (pedal stroke) in the brake pedal is non-linear.

For this reason, in the invention according to the tenth aspect as constructed above, in any one of claims 7 to 9, the characteristic of the load to the deformation in the reaction force spring is set to be non-linear in the state that the master cylinder and the reservoir tank are in communication through the port. Therefore, while the stepping-on of the brake pedal causes the piston to move from the first position to the second position, it is possible to give the driver a further favorable pedal feeling by the urging force of the reaction force spring.

Generally, it is desired that a predetermined stepping force (e.g., 500N) attains a predetermined deceleration (e.g., 0.25 G or higher). On the other hand, the stepping force is the sum of the reaction force by the master cylinder pressure and the urging force of the reaction force spring.

Thus, in the invention according to the eleventh aspect as constructed above, in claim 10, the characteristic of the load to the deformation in the reaction force spring is set to be non-linear in the state that the master cylinder and the reservoir are in communication and to be linear in the state that the master cylinder and the reservoir are not in communication, wherein the increase of the load relative to the increase of the deformation in the linear property is set to be equal to or less than the increase of the load relative to the increase of the deformation in the non-linear property. In this way, by restricting the urging force of the reaction force spring, it is possible to obtain the deceleration within the predetermined range by the predetermined stepping force.

BRIEF DESCRIPTION OF THE DRAWINGS

[FIG. 2] is a view showing a base hydraulic brake force generating device shown in FIG. 1 which is in the state before a brake stepping-on.

[FIG. 3] is a view showing the base hydraulic brake force generating device shown in FIG. 1 which is in the state of being in the brake stepping-on.

[FIGS. 12(a) and 12(b)] are enlarged fragmentary sectional view of a master cylinder in a fourth embodiment applying thereto a vehicle brake device according to the present invention, wherein [FIG. 12(a)] is a view showing the state (first position) that the base hydraulic brake force generating device is before the brake stepping-on and wherein [FIG. 12(b)] is a view showing the state (particularly, second position) that it is in the brake stepping-on.

EMBODIMENTS FOR PRACTICING THE INVENTION

1) First Embodiment

Figure 1:
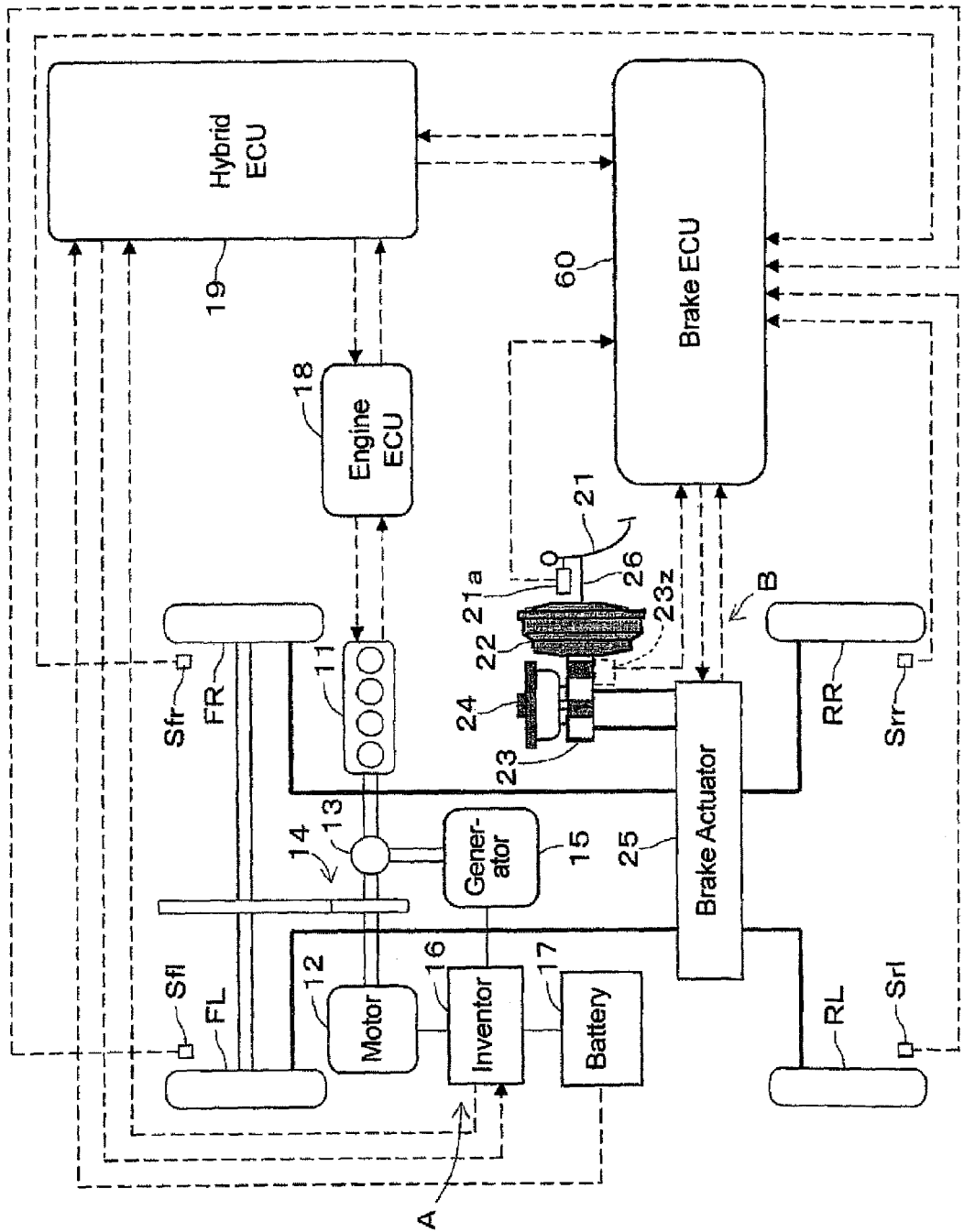
[FIG. 1] is a schematic view showing a first embodiment applying thereto a vehicle brake device according to the present invention.
Figure 2:
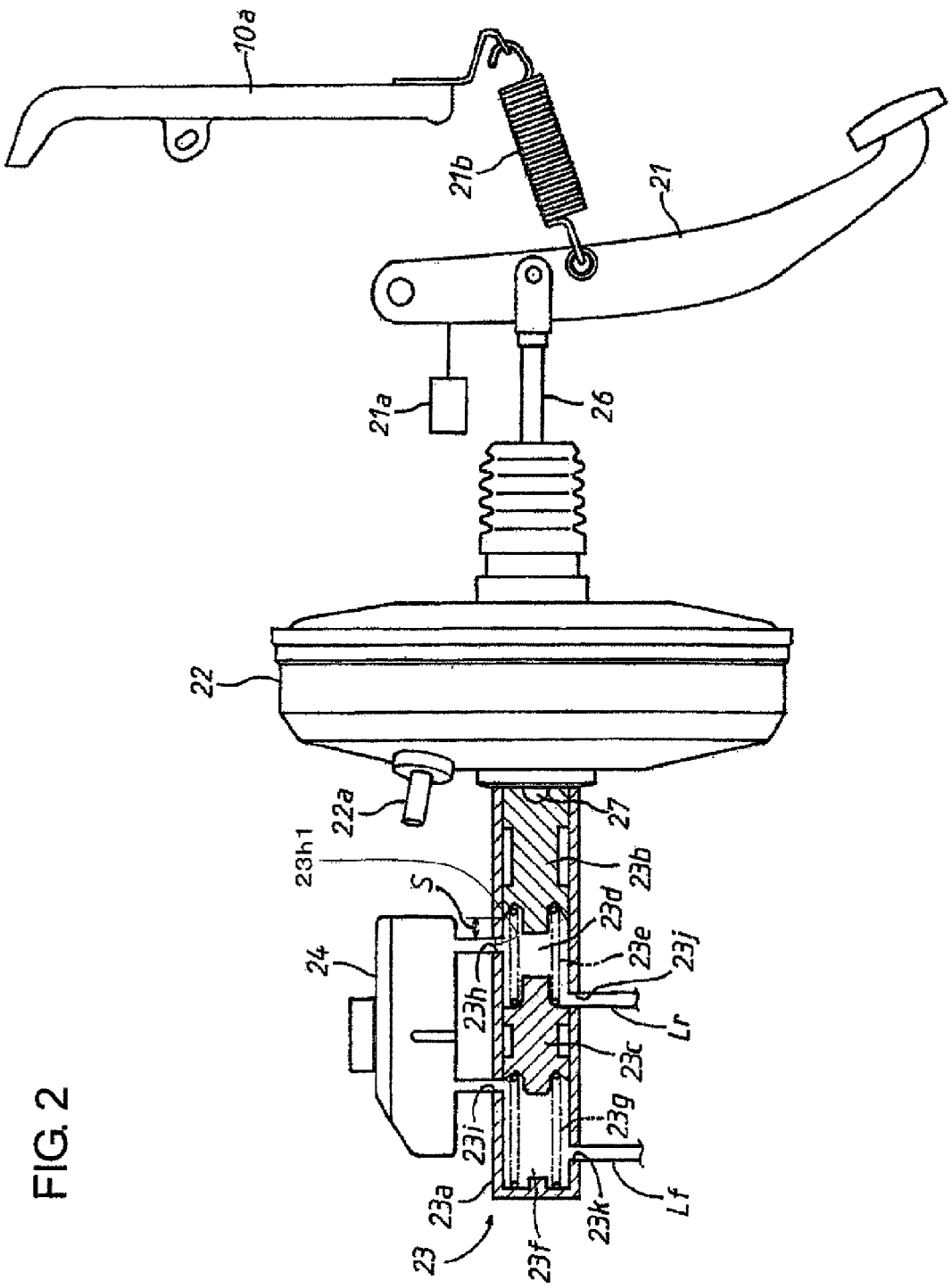

Hereinafter, with reference to the drawings, description will be made regarding a first embodiment in which a vehicle brake device according to the present invention is applied to a hybrid vehicle. FIG. 1 is a schematic view showing the construction of the hybrid vehicle, and FIG. 2 is a schematic view showing the construction of a base hydraulic brake force generating device of the vehicle brake device. As shown in FIG. 1, the hybrid vehicle is a vehicle that drives driving wheels, for example, left and right front wheels FL, FR by a hybrid system. The hybrid system is a power train which uses two kinds of power sources comprising an engine 11 and a motor 12. In the case of the present first embodiment, it is a parallel hybrid system that directly drives the wheels by both of the engine 11 and the motor 12. Besides, there is a serial hybrid system, in which the wheels are driven by the motor 12 and the engine 11 operates as an electricity supply source to the motor 12.

The hybrid vehicle mounting the parallel hybrid system is provided with the engine 11 and the motor 12. The driving power of the engine 11 is transmitted to the driving wheels (the left and right front wheels FL, FR in the present first embodiment) through a power splitting mechanism 13 and a power transmitting mechanism 14. The driving power of the motor 12 is transmitted to the driving wheels through the power transmitting mechanism 14. The power splitting mechanism 13 properly splits the driving power of the engine 11 into a vehicle driving power and a generator driving power. The power transmitting mechanism 14 properly combines the driving powers of the engine 11 and the motor 12 in dependence on the traveling conditions to transmit the combined driving power to the driving wheels. The power transmitting mechanism 14 regulates the ratio of the driving powers transmitted from the engine 11 and the motor 12 in a range of 0:100 to 100:0. The power transmitting mechanism 14 has a speed change function.

The motor 12 is for enhancing the driving power by assisting the output of the engine 11 but is for charging a battery 17 by generating electricity at the time of braking the vehicle. The generator 15 is for generating electricity by the output of the engine 11 and has a function as a starter at the time of an engine starting. These motor 12 and generator 15 are electrically connected to an inverter 16. The inverter 16 is electrically connected to the battery 17 as a direct current power supply and is for converting the alternating current voltages inputted from the motor 12 and the generator 15 into direct current voltages to supply the same to the battery 17, and conversely, converting the direct current voltage from the battery 17 into alternating current voltage to output the same to the motor 12 and the generator 15.

In the present first embodiment, a regenerative brake device A is composed of the motor 12, the inverter 16 and the battery 17. The regenerative brake device A makes some of respective wheels FL, FR, RL, RR (in the present first embodiment, the left and right front wheels driven by the motor 12 being a driving source) generate a regenerative brake force that is based on the brake manipulation state (referred to later) detected by a pedal stroke sensor 21a (or a pressure sensor P).

The engine 11 is controlled by an engine ECU (electronic control unit) 18, and the engine ECU 18 outputs an opening-degree command to an electronically controlled throttle in accordance with an engine output demand value from a hybrid ECU (electronic control unit) 19 referred to later to regulate the rotational speed of the engine 11. The hybrid ECU 19 is connected to the inverter 16 to be communicable with each other. The hybrid ECU 19 derives an engine output, an electric motor torque and a generator torque required from the accelerator opening degree and a shift position (calculated from a shift position signal inputted from a shift position sensor (not shown)), transmits the derived engine output demand value to the engine ECU 18 to control the driving power of the engine 11, and controls the motor 12 and the generator 15 through the inverter 16 in accordance with the electric motor torque demand value and the generator torque demand value so derived. Further, the hybrid ECU 19 is connected to the battery 17 and observes the charging state, the charged current and the like. Further, the hybrid ECU 19 is also connected to an accelerator opening-degree sensor (not shown) that is assembled to an accelerator pedal (not shown) for detecting the accelerator opening degree of the vehicle, and inputs an accelerator opening-degree signal from the accelerator opening-degree sensor.

Figure 5:
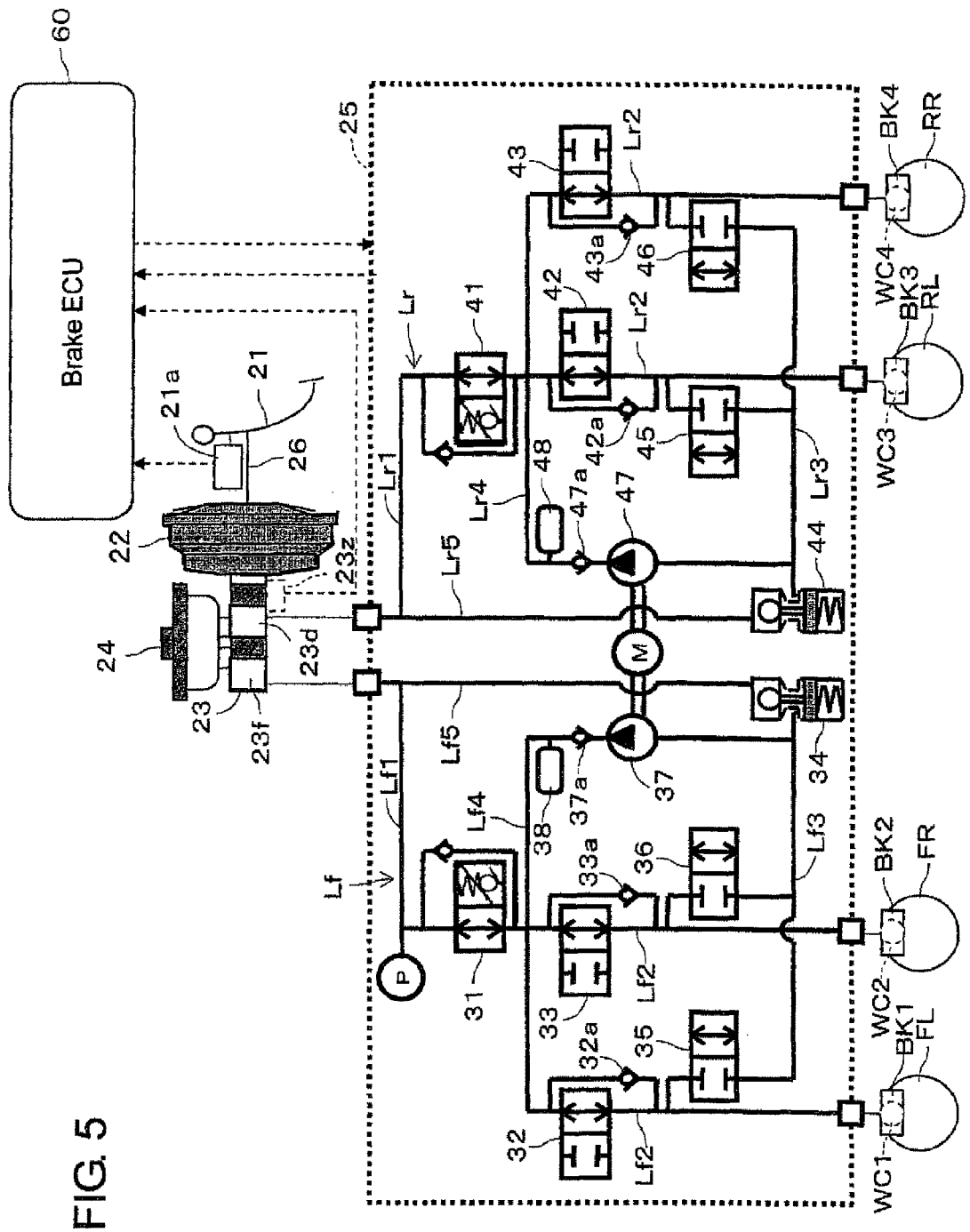
[FIG. 5] is a schematic view showing the outline of a brake actuator of a hydraulic brake device shown in FIG. 1.

Further, the hybrid vehicle is provided with a hydraulic brake device B that directly applies a hydraulic brake force to respective vehicle wheels FL, FR, RL, RR to brake the vehicle. As shown in FIG. 5, the hydraulic brake device B is constructed so that it is able to make the respective wheels FL, FR, RL, RR FR generate a base hydraulic brake force corresponding to a base hydraulic pressure by generating by a master cylinder 23 the base hydraulic pressure corresponding to the brake manipulation state made by the stepping-on of the brake pedal 21 and by directly applying the generated base hydraulic pressure to wheel cylinders WC1, WC2, WC3, WC4 of the respective wheels FL, FR, RL, RR FR that are connected to the master cylinder 23 through oil passages Lf, Lr with hydraulic pressure control valves 31, 41 provided thereon. The hydraulic brake device B is also constructed so that it is able to generate a controlled hydraulic pressure, that is built by driving pumps 37, 47 and by controlling the hydraulic pressure control valves 31, 41 independently of the base hydraulic pressure generated in correspondence to the brake manipulation state, on the respective wheels FL, FR, RL, RR by applying the controlled hydraulic brake force to the wheel cylinders WC1, WC2, WC3, WC4 of the respective wheels FL, FR, RL, RR FR.

The hydraulic brake device B is provided with a vacuum booster 22 being a booster device that assists and boosts (increases) a brake manipulation force generated by the stepping-on manipulation of the brake pedal 21 as a result of applying an intake vacuum pressure of the engine 11 to a diaphragm, the master cylinder 23 that generates brake fluid (oil) of a hydraulic pressure (oil pressure) being a base hydraulic pressure corresponding to the brake manipulation force (that is, the manipulation state of the brake pedal) boosted by the vacuum booster 22, to supply the brake fluid to the wheel cylinders WC1-WC4, a reservoir tank 24 that stores brake fluid to replenish the brake fluid to the master cylinder 23, and a brake actuator (controlled hydraulic brake force generating device) 25 that is provided between the master cylinder 23 and the wheel cylinders WC1-WC4 to built the controlled hydraulic pressure. The brake pedal 21, the vacuum booster 22, the master cylinder 23 and the reservoir tank 24 constitute a base hydraulic brake force generating device.

Figure 3:
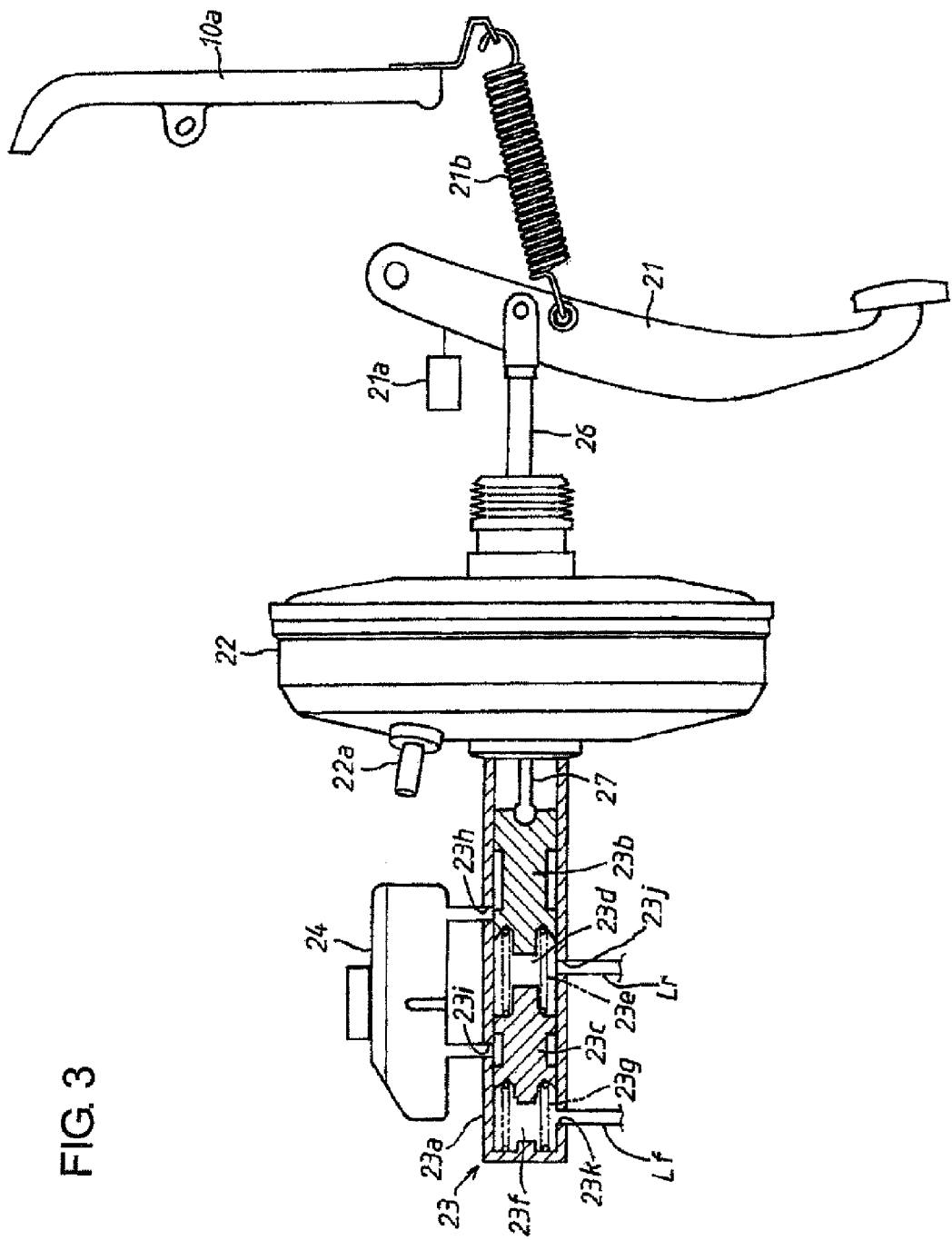

As shown in FIGS. 2 and 3, the brake pedal 21 is connected to the vacuum booster 22 through an operating rod 26, and the vacuum booster 22 is connected to the master cylinder 23 through a push rod 27. The brake manipulation force applied to the brake pedal 21 is inputted to the vacuum booster 22 through the operating rod 26 and is boosted to be inputted to the master cylinder 23 through the push rod 27.

The brake pedal 21 is provided with a pedal stroke sensor 21*a* for detecting a brake pedal stroke being a brake manipulation state made by the stepping-on of the brake pedal 21. The pedal stroke sensor 21*a* is connected to the brake ECU 60 to transmit its detection signal to the brake ECU 60. Further, the brake pedal 21 is provided with a reaction force spring 21*b* being pedal reaction force building means for building a pedal reaction force against the brake pedal 21 until the brake manipulation state reaches a predetermined state (referred to later). The reaction force spring 21*b* is connected at its one end to a bracket 10*a* fixed to the vehicle body and urges the brake pedal 21 in a stepping-on release direction being an opposite direction to the stepping-on direction (i.e., in a direction to return the brake pedal 21 to its home position before the stepping-on). The urging force of the reaction force spring 21*b* is desirably determined in taking into consideration the inner diameter of a housing 23*a* of the master cylinder 23, the boosting ratio and the like.

The vacuum booster 22 is one generally well known and communicates at its vacuum inlet port 22*a* with an intake manifold of the engine 11 to utilize the vacuum in the intake manifold as a boosting power source.

As shown in FIGS. 2 and 3, the master cylinder 23 is a tandem master cylinder and is composed of the housing 23*a* in the form of a bottomed cylinder, first and second pistons 23*b*, 23*c* received to be fluid-tightly and slidable within the housing 23*a* in a tandem fashion, a first spring 23*e* arranged in a first hydraulic chamber 23*d* formed between the first piston 23*b* and the second piston 23*c*, and a second spring 23*g* arranged in a second hydraulic chamber 23*f* formed between the second piston 23*c* and a closed end of the housing 23*a*. Thus, the second piston 23*c* is urged by the second spring 23*g* toward an open end side (toward the first piston 23*b* side), and the first piston 23*b* is urged by the first spring 23*e* toward the open end side, whereby one end (open end side end) of the first piston 23*b* is pressured on and brought into contact with an end of the push rod 27.

The housing 23*a* of the master cylinder 23 is provided with a first port 23*h* making the first hydraulic chamber 23*d* communicate with the reservoir tank 24 and a second port 23*i* making the second hydraulic chamber 23*f* communicate with the reservoir tank 24. In the state that the driver's foot is separated from the brake pedal 21, that is, in the state that the brake pedal 21 is not stepped on, the first piston 23*b* is at a first position (the returned position: the illustrated state in FIG. 2). The first port 23*h* for the first piston 23*b* is arranged at a second position that is separated from a closing end for closing the port 23*h* of the first piston 23*b* at the first position by a predetermined distance S in a pressure increasing direction (in a direction toward the closing end side: in the leftward direction in FIG. 2) and that corresponds to a predetermined state. When, similarly to the first piston 23*b*, the second piston 23*c* is at a first position (the returned position: the illustrated state in FIG. 2), the second port 23*i* is arranged at a position where a closing end for closing the second port 23*i* of the second piston 23*c* is in agreement with an opening end of the second port 23*i* (that is, at a position immediately before the closing end of the second piston 23*c* begins to close the opening of the second port 23*i*).

It is to be noted that the predetermined state is a brake manipulation state wherein the restriction on the generation of the base hydraulic brake force is released and wherein the base hydraulic brake force begins to increase in correspondence to the brake manipulation state. Further, the predetermined distance S is desirably set to make the regenerative brake device A generate the maximum regenerative brake force when the brake manipulation state is the predetermined state. Thus, when the brake manipulation state turns into the predetermined state, the master cylinder 23 is released from the restriction on the generation of the base hydraulic brake force, and the regenerative brake device A generates the maximum regenerative brake force.

Figure 4:
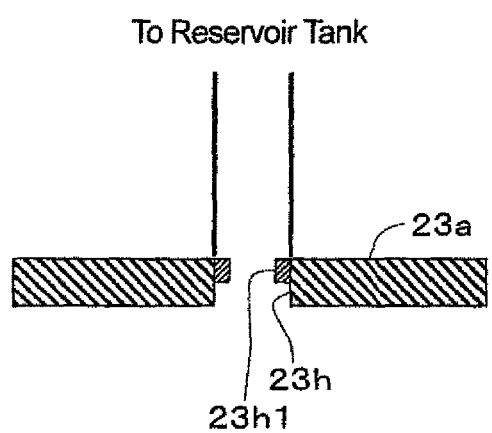
[FIG. 4] is an enlarged fragmentary sectional view of a first port shown in FIG. 2.

Further, as show in FIG. 4, an orifice 23*h*1 is provided in the first port 23*h*. The orifice 23*h*1 is configured to restrict the flow of the brake fluid from the master cylinder 23 to the reservoir tank 24 at the time of a quick stepping of the brake pedal 21 but not to restrict the flow of the brake fluid at the time of a non-quick stepping. The inner diameter of the orifice 23h1 is set to be smaller in diameter than that of a third port 23j (set to be small in the cross-section area of the passage).

Further, the housing 23a of the master cylinder 23 is provided with the third port 23j that makes the first hydraulic chamber 23d communicate with an oil passage Lr constituting a rear wheel system, and a fourth port 23k that makes the second hydraulic chamber 23f communicate with an oil passage Lf constituting a front wheel system. As shown in FIG. 5, the oil passage Lr makes the first hydraulic chamber 23d communicate with the wheel cylinders WC3, WC4 of the left and right rear wheels RL, RR, and the oil passage Lf makes the second hydraulic chamber 23f communicate with the wheel cylinders WC1, WC2 of the left and right front wheels FL, FR.

When supplied with the hydraulic pressure (base hydraulic pressure, controlled hydraulic pressure) from the master cylinder 23 through the oil passages Lf, Lr, the respective wheel cylinders WC1, WC2, W3, W4 respectively operate respective brake means BK1, BK2, BK3, BK4, provided respectively in correspondence to the respective wheel cylinders WC1, WC2, WC3, WC4, to apply a hydraulic brake force (base hydraulic brake force, control hydraulic brake force) to the respective wheels FL, FR, RL, RR. As the respective brake means BK1, BK2, BK3, BK4, there are disc brakes, drum brakes or the like, which are constructed so that friction members such as brake pads, brake shoes or the like restrict the rotations of disc rotors, brake drums or the like provided bodily with the wheels.

The operation of the aforementioned master cylinder 23 will be described with reference to FIGS. 2 and 3. As shown in FIG. 2, in the state that the brake pedal 21 is not being stepped on, the operating rod 26 and the push rod 27 are not pushed and not moved. Thus, the first piston 23b and the second piston 23c are also not pushed, whereby a base hydraulic pressure is not generated in the first and second hydraulic chambers 23d, 23f.

However, when the brake pedal 21 in the state of being not stepped on (refer to FIG. 2) is quickly stepped on by the driver, the operating rod 26 and the push rod 27 are pushed, and thus, the first piston 23b is pushed. At this time, the closing end of the first piston 23b does not begin to close the first port 23h until the first piston 23b pushed by the push rod 27 moves beyond the predetermined distance S in the leftward direction as viewed in the figure (in the pressure increasing direction). Further, the orifice 23h1 of the first port 23h does not restrict the flow of brake fluid from the master cylinder 23 to the reservoir tank 24. Thus, since the brake fluid in the first hydraulic chamber 23d is allowed to flow to the reservoir tank 24 through the first port 23h without being increased in the back pressure (that means the brake hydraulic pressure in the first port 23h), the base hydraulic pressure is not generated in the first hydraulic chamber 23d. Further, since the base hydraulic pressure is not generated in the first hydraulic chamber 23d though the movement of the first piston 23b causes the first spring 23e to be pushed and compressed, the second piston 23c is not pushed in the leftward direction as viewed in the figure (in the pressure increasing direction) and remains stopped at the first position. Thus, since the closing end of the second piston 23c does not begin to close the second port 23i, a base hydraulic pressure is not generated in the second hydraulic chamber 23f either.

When the first piston 23b is moved by a value that is made by adding the diameter of the first port 23h to the predetermined distance S, in the leftward direction as viewed in the figure, the first port 23h is closed by the closing end of the first piston 23b. Thus, since the brake fluid in the first hydraulic chamber 23d becomes unable to be discharged into the reservoir tank 24 through the first port 23h, the first fluid chamber 23d is brought into a closed state, whereby a base hydraulic pressure begins to be generated in the first hydraulic chamber 23d. Further, since the second piston 23c is pushed in the leftward direction as viewed in the figure upon receipt of the base hydraulic pressure generated in the first hydraulic chamber 23d thereby to make its closing end close the second port 23i instantly, the brake fluid in the second hydraulic chamber 23f becomes unable to be discharged into the reservoir tank 24 through the second port 23i, and the second fluid chamber 23f is brought into a closed state, whereby a base hydraulic pressure begins to be generated also in the second hydraulic chamber 23f.

In this way, when the stepping-on state shown in FIG. 3 is reached as a result that the brake pedal 21 is further stepped on from the state that the base hydraulic pressure begins to be generated in the first and second hydraulic chambers 23d, 23f, the base hydraulic pressure depending on the brake manipulation state is generated in the first and second hydraulic chambers 23d, 23f during the period which continues from the base hydraulic pressure generation start state to the stepping-on state shown in FIG. 3 (after the base hydraulic pressure generation start state). The first and second hydraulic chambers 23d, 23f are designed to generate the same base hydraulic pressures therein. When the brake pedal 21 is released from the stepping-on state shown in FIG. 3, the first and second pistons 23b, 23c are returned to their home positions (the first positions) by means of urging forces of the first and second springs 23e, 23g and upon receipt of the pressures in the oil passages Lr, Lf.

Figure 6:
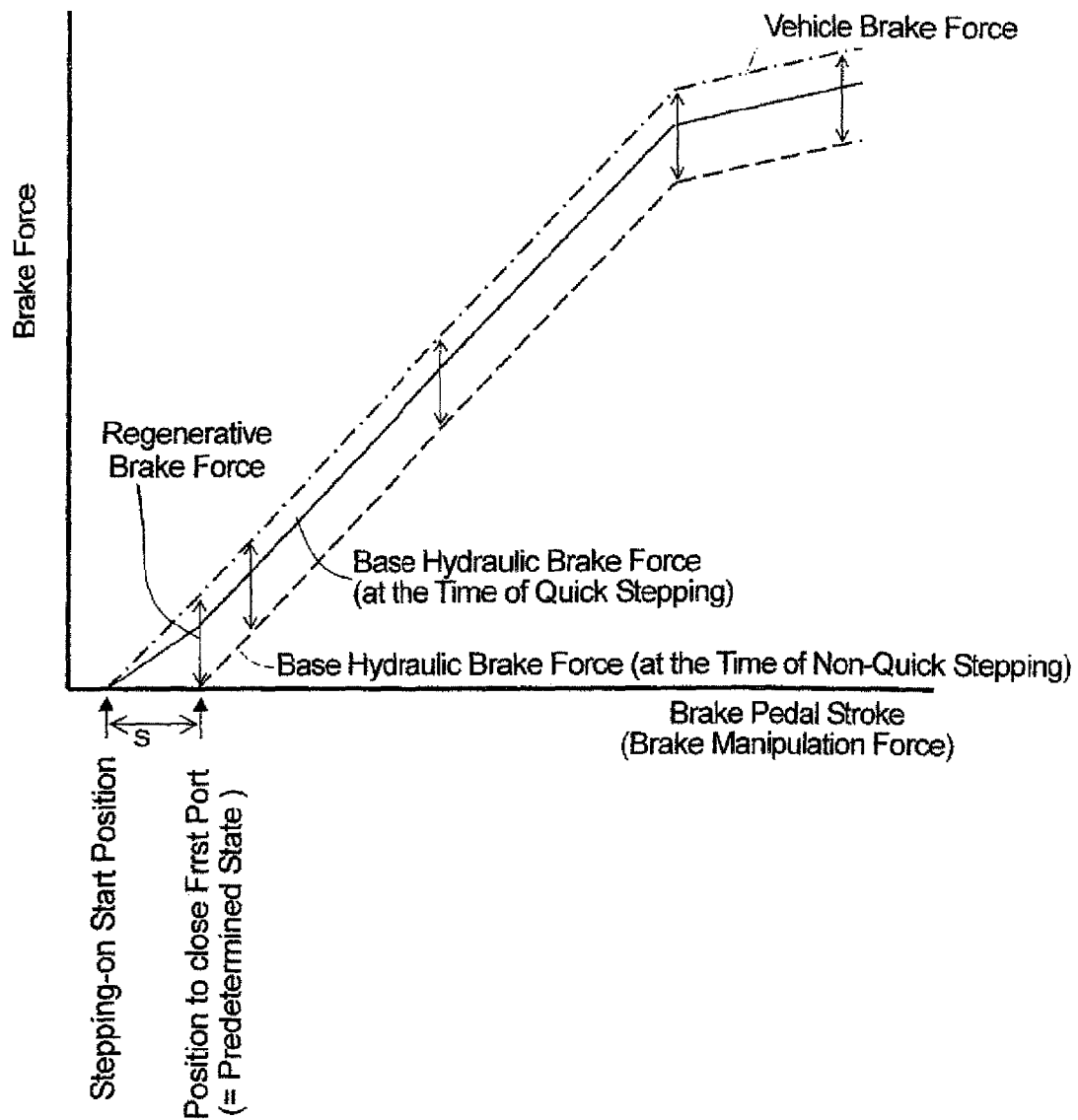
[FIG. 6] is a correlation graph between brake manipulation forces and brake forces in the first embodiment applying thereto the vehicle brake device according to the present invention.

The aforementioned base hydraulic brake force by the base hydraulic pressure generated by the master cylinder 23 is varied as indicated by the broken line in FIG. 6. That is, when the brake pedal stroke is between the stepping-on start position and the position to close the first port 23h, the base hydraulic pressure generated in the first and second hydraulic chambers 23d, 23f is restricted to zero, so that the generation of the base hydraulic brake force is also restricted to zero. Then, when the brake pedal stroke is at a position beyond the position to close the first port 23h, the aforementioned restriction on the generation of the base hydraulic pressure is released to make the first and second hydraulic chambers 23d, 23f generate the base hydraulic pressure corresponding to the brake pedal stroke, so that the base hydraulic brake force is generated in correspondence to the brake pedal stroke. The state that the brake pedal stroke resides at the position to close the first port 23h is the predetermined state and is the brake manipulation state that the base hydraulic brake force begins to increase in correspondence to the brake pedal stroke. Accordingly, as indicated by the broken line in FIG. 6, the base hydraulic brake force corresponding to the base hydraulic pressure can be generated on the respective wheels FR, FL, RR, RL by directly applying the base hydraulic pressure to the wheel cylinders WC1, WC2, WC3, WC4.

On the other hand, when the brake pedal 21 is quickly stepped on by the driver, the operating rod 26 and the push rod 27 are pushed, whereby the first piston 23b is pushed. At this time, the first port 23h does not begin to be closed by the closing end of the first piston 23b until the first piston 23b moves through the predetermined distance S or more in the leftward direction as viewed in the figure by being pushed by the push rod 27. However, the orifice 23h1 of the first port 23h restricts the flow of the brake fluid from the master cylinder 23 to the reservoir tank 24. As a result, because the back pressure is increased, the brake fluid in the first hydraulic chamber 23d is restrained from flowing into the reservoir tank 24 through the first port 23*h*. Thus, the base hydraulic pressure is generated in the first hydraulic chamber 23*d*. Further, since the second piston 23*c* is pushed in the leftward direction in the figure by the base hydraulic pressure generated in the first hydraulic chamber 23*d*, to close the second port 23*i* by the closing end thereof instantly, the brake fluid in the second hydraulic chamber 23*f* becomes unable to flow into the reservoir tank 24 through the second port 23*i*, and a tightly closed state is made in the second hydraulic chamber 23*f*, whereby the generation of the base hydraulic pressure is also started in the second hydraulic chamber 23*f*. In this way, when the driver quickly steps on the brake pedal 21, it is possible to positively generate the base hydraulic brake force with the brake pedal stroke being between the stepping-on start position and the position to close the first port 23*h*.

Further, during this period, by a cooperative operation with the hydraulic brake device B to attain the vehicle brake force corresponding to the brake manipulation state, the regeneration brake device A compensates for the deficiency in the basic hydraulic brake force relative to the vehicle brake force by the regenerative brake force. Accordingly, in a low pedal pressure area that extends in pedal stroke from the stepping-on start position to the position to close the first port 23*h*, it is possible at the time of the quick stepping of the brake pedal 21 to early apply the base hydraulic brake force in preference to high regenerative efficiency/high fuel efficiency.

Further, when the first piston 23*b* moves in the leftward direction in the figure by the value made by adding the diameter of the first port 23*h* to the predetermined distance S, the first port 23*h* is closed by the closing end of the first piston 23*b*, and the brake fluid in the first hydraulic chamber 23*d* becomes completely unable to flow to the reservoir tank 24 through the first port 23*h*. Thus, a tightly closed state is made in the first hydraulic chamber 23*d*, whereby the base hydraulic pressure generated in the first hydraulic chamber 23*d* further increases.

The base hydraulic brake force by the aforementioned base hydraulic pressure built by the master cylinder 23 becomes as indicated by the solid line in FIG. 6. That is, when the brake pedal stroke resides between the stepping-on start position and the position to close the first port 23*h*, the base hydraulic pressure generated in the first and the second pressure chamber 23*d*, 23*f* is generated in dependence on the pedal stroke without being restricted. Therefore, the base hydraulic brake force is also generated in correspondence to the brake pedal stroke. Then, when the brake pedal stroke resides at a position that is beyond the position to close the first port 23*h*, the base hydraulic pressure becomes the pressure corresponding to the brake pedal stroke, and the base hydraulic brake force also becomes the force corresponding to the brake pedal stroke.

Further, the gradient of the base hydraulic brake force at the time of the quick stepping and the gradient of the base hydraulic brake force at the time of the non-quick stepping are determined by the characteristics of the master cylinder 23 and the vacuum booster 22 and have the same property. Further, since the first piston 23*b* is pushed from the stepping-on start point of time, the point of time when the base hydraulic brake force rises at the time of the quick stepping becomes earlier in comparison with that at the time of the non-quick stepping.

Next, the brake actuator 25 will be described in detail with reference to FIG. 5. The brake actuator 25 is generally well-known and is constructed by packaging, in one case, hydraulic control valves 31, 41, pressure increase control valves 32, 33, 42, 43 and pressure reducing control values 35, 36, 45, 46 that constitute ABS control valves, pressure regulating reservoirs 34, 44, pumps 37, 47, a motor M and the like.

First, the construction of the front wheel system in the brake actuator 25 will be described. The oil passage Lf is provided with the hydraulic control valve 31 constituted by a differential pressure control value. The hydraulic control valve 31 is controllable to be switched by the brake ECU 60 between a communication state and a differential pressure state. The hydraulic control valve 31 is usually held in the communication state, and, when brought into the differential pressure state, is able to hold an oil passage Lf2 on the wheel cylinders WC1, WC2 side to be higher by a predetermined differential pressure than an oil passage Lf1 on the master cylinder 23 side. The differential pressure is regulated in dependence on a control current from the brake ECU 60.

The oil passage Lf2 is divided into two, wherein one is provided with the pressure increase control valve 32 for controlling the increase in the brake fluid pressure to the wheel cylinder WC1 at the time of a pressure increase mode in the ABS control and wherein the other is provided with the pressure increase control valve 33 for controlling the increase in the brake fluid pressure to the wheel cylinder WC2 at the time of the pressure increase mode in the ABS control. These pressure increase control valves 32, 33 are constituted as two-position valves which are controllable by the brake ECU 60 with respect to the communication/closed state. Further, when these pressure increase control valves 32, 33 are controlled to be in the communication state, it is possible to add to the respective wheel cylinders WC1, WC2 the base hydraulic pressure of the master cylinder 23 or/and the controlled hydraulic pressure built by the driving of the pump 37 and the controlling of the hydraulic control valve 31. Further, the pressure increase control valves 32, 33, together with the pressure reducing control valves 35, 36 and the pump 37, can perform the ABS control.

These pressure increase control valves 32, 33 are controlled to be in the communication state at all times in the normal braking wherein the ABS control is not performed. Further, the pressure increase control valves 32, 33 are respectively provided with safety valves 32*a*, 33*a* in parallel thereto, and when the brake pedal 21 is released at the time of the ABS control, the brake fluids from the wheel cylinders WC1, WC2 side are returned to the reservoir tank 24 as a consequence.

Further, the oil passages Lf2 between the pressure increase control valves 32, 33 and the respective wheel cylinders WC1, WC2 communicates with the pressure regulating reservoir 34 through the oil passages Lf3. The pressure reducing control valves 35, 36 whose communication/block state is controllable by the brake ECU 60 are arranged respectively on the oil passages Lf3. These pressure reducing control valves 35, 36 are held in a blocked state at all times in the normal braking state (at the time of the non-operation of the ABS) and, when properly brought into communication state, drain the brake fluid to the pressure regulating reservoir 34 through the oil passages Lf3. Thus, the pressure reducing control valves 35, 36 are configured to control the brake fluid pressures in the wheel cylinders WC1, WC2 to prevent the wheels from reaching the tendency to be locked.

Furthermore, the pump 37 together with a safety valve 37*a* is arranged on an oil passage Lf4 that connects the oil passage Lf2 between the hydraulic control valve 31 and the pressure increase control valves 32, 33 to the pressure regulating reservoir 34. Further, an oil passage Lf5 is provided to connect the pressure regulating reservoir 34 with the master cylinder 23 through the oil passage Lf1. The pump 37 is driven by the motor M in response to a command from the brake ECU 60.

At the time of a pressure reducing mode in the ABS control, the pump 37 draws the brake fluid in the wheel cylinders WC1, WC2 or the brake fluid stored in the pressure regulating reservoir 34 and returns the drawn brake fluid to the master cylinder 23 through the hydraulic control valve 31 being in the communication state. Further, in building a controlled hydraulic pressure that is used for stably controlling the posture of the vehicle in a VSC control, a traction control, a brake assist or the like, in order that the hydraulic control valve 31 having been switched to the differential pressure state generates a differential pressure, the pump 37 draws the brake fluid in the master cylinder 23 through the oil passages Lf1, Lf5 and the pressure regulating reservoir 34 and discharges the drawn brake fluid to the respective wheel cylinders WC1, WC2 through the oil passages Lf4, Lf2 and the pressure increase valves 32, 33 being in the communication state to supply the controlled hydraulic pressure thereto. In order to mitigate the pulsation in the brake fluid discharged by the pump 37, an accumulator 38 is arranged on the upstream side of the pump 37 on the oil passage Lf4.

Further, the oil passage Lf1 is provided with a pressure sensor P for detecting the master cylinder pressure being the brake fluid pressure in the master cylinder 23. The detection signal is transmitted to the brake ECU 60. The pressure sensor P may be provided on the oil passage Lr1.

Further, the rear wheel system in the brake actuator 25 is similar in construction to the aforementioned front wheel system. Like the oil passage Lf, the oil passage Lr constituting the rear wheel system is composed of oil passages Lr1-Lr5. The oil passage Lr is provided with the hydraulic control valve 41 similar to the hydraulic control valve 31 and the pressure regulating reservoir 44 similar to the pressure regulating reservoir 34. Branching oil passages Lr2, Lr2 being in communication with the wheel cylinders WC3, WC4 are provided thereon with the pressure increase control valves 42, 43 similar to the pressure increase control valves 32, 33, and the oil passages Lr3 are provided with the pressure reducing control valves 45, 46 similar to the pressure reducing control valves 35, 36. The oil passage Lr4 is provided with the pump 47, a safety valve 47a and an accumulator 48 which are similar to the pump 37, the safety valve 37a and the accumulator 38. The pressure increase control valves 42, 43 are provided with safety valves 42a, 43a similar to the safety valves 32a, 33a in parallel thereto.

With this construction, the controlled hydraulic pressures built by the driving of the pumps 37, 47 and the controlling of the hydraulic control valves 31, 41 are applied to the wheel cylinders WC1, WC2, WC3, WC4 of the respective wheels FL, FR, RL, RR, whereby the controlled hydraulic brake force is generated on the respective wheels FL, FR, RL, RR.

Further, as shown mainly in FIG. 1, the vehicle brake device is provided with the pedal stroke sensor 21a, respective wheel speed sensors Sfl, Sfr, Srl, Srr for detecting the wheel speeds of the respective wheels FL, FR, RL, RR, the pressure sensor P, and the brake ECU (electronic control unit) 60 connected to the respective control valves 31, 32, 33, 35, 36, 41, 42, 43, 45, 46 and the motor M. Based on the detections by these sensors and the state of a shift switch, the brake ECU 60 performs the switching control or current application control of the states of the respective control valves 31, 32, 33, 35, 36, 41, 42, 43, 45, 46 in the hydraulic brake device B to control the controlled fluid pressure applied to the wheel cylinders WC1-WC4, that is, the controlled hydraulic brake force applied to the respective wheels FL, FR, RL, RR.

Further, the brake ECU 60 is connected to the hybrid ECU 19 to be able to communicate with each other and performs cooperative controls of the hydraulic brake and the regenerative brake carried out by the motor 12 so that the total brake force for the vehicle becomes equal to that of a vehicle having a hydraulic brake only. Specifically, in response to the driver's braking demand, that is, the brake manipulation state, the brake ECU 60 outputs to the hybrid ECU 19 a regenerative demand value which, of the total brake force, is a part to be undertaken by the regenerative brake device, as a target value for the regenerative brake device, that is, as a target regenerative brake force. Based on the inputted regenerative demand value (target regenerative brake force), the hybrid ECU 19 derives an actual regenerative execution value to be actually applied as a regenerative brake, by taking account of the vehicle speed, the battery charging state and the like and controls the motor 12 through the inverter 16 to generate a regenerative brake force corresponding to the actual regenerative execution value and outputs the derived actual regenerative execution value to the brake ECU 60.

Further, the brake ECU 60 stores the base hydraulic brake force that the brake means BK1, BK2, BK3, BK4 are to apply to the wheels FL, FR, RL, RR when the base hydraulic pressure is supplied to the wheel cylinder WC1, WC2, WC3, WC4, in a memory in the form of a map, a table or calculation expressions in advance. Further, the brake ECU 60 stores the target regenerative brake force that is to be applied to the wheels FL, FR, RL, RR in dependence on the brake manipulation state being the stroke of the brake pedal (or the master cylinder pressure), in the memory in the form of a map, a table or calculation expressions in advance. Further, the brake ECU 60 stores a cooperative control program (vehicle brake control program) shown in FIG. 7.

Figure 7:
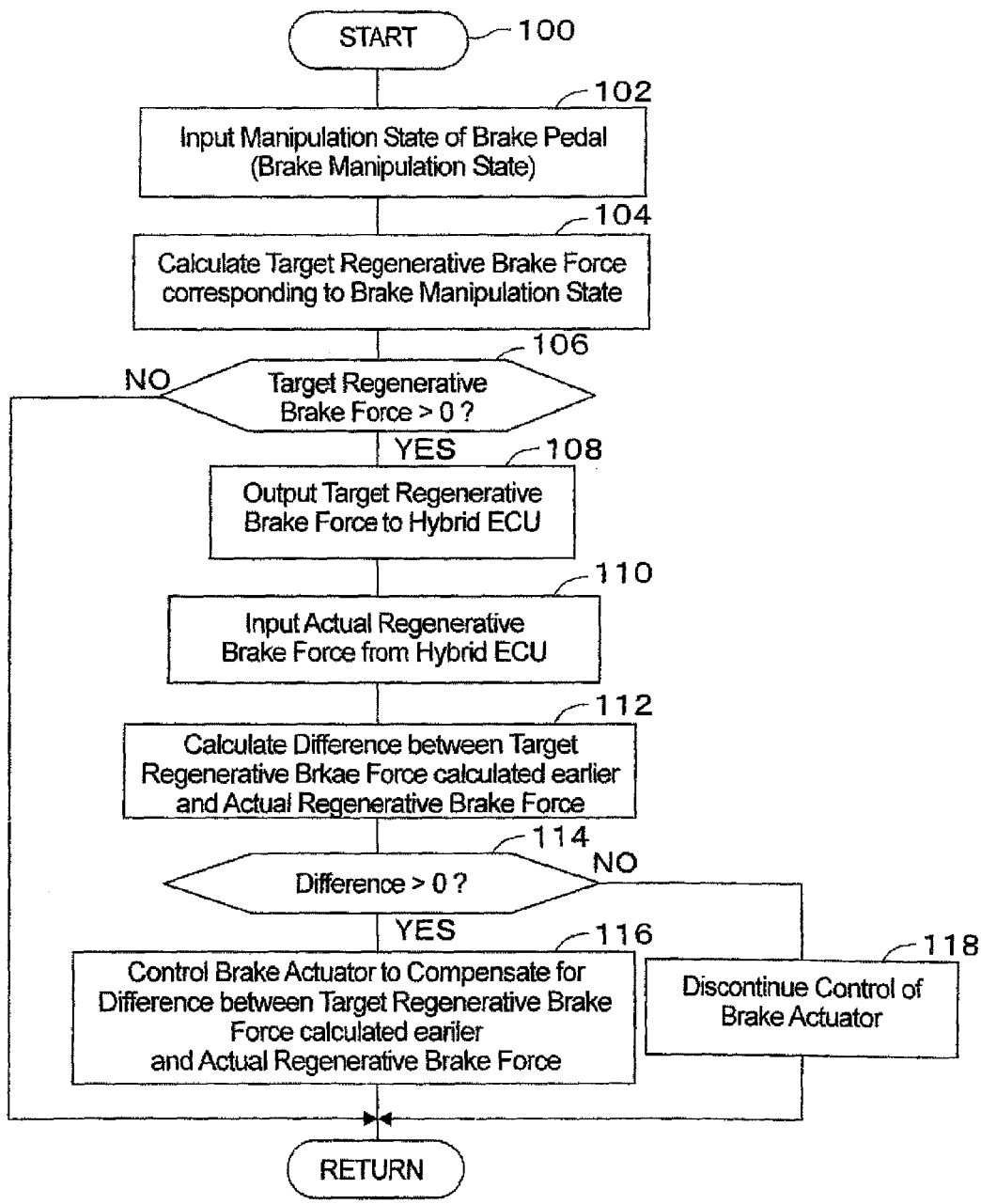
[FIG. 7] is a flow chart of a control program executed by a brake ECU shown in FIG. 1.

Next, the operation of the vehicle brake device as constructed above will be described in accordance with the flow chart of FIG. 7. For example, when an ignition switch (not shown) of the vehicle is ON, the brake ECU 60 performs the program corresponding to the aforementioned flow chart at intervals of a predetermined short period of time. The brake ECU 60 inputs the pedal stroke being the manipulation state of the brake pedal 21 from the pedal stroke sensor 21a (step 102) and calculates a target regenerative brake force corresponding to the inputted pedal stroke (step 104). At this time, the brake ECU 60 uses the map, the table or the calculation expressions stored in advance and representing the relation between the pedal strokes or the brake manipulation states and the target regenerative brake forces to be applied to the wheels FL, FR, RL, RR.

If the target regenerative brake force is larger than zero, the target regenerative brake force calculated at step 104 is outputted to the hybrid ECU 19, and no control is executed with the brake actuator 25 (steps 106, 108). Thus, when the brake pedal 21 is being stepped on, like the aforementioned case, the hydraulic brake device B applies the base hydraulic brake force (static pressure brake) only to the wheels FL, FR, RL, RR. Further, the hybrid ECU 19 inputs thereto the regenerative demand value indicating the target regenerative brake force and, based on the value, controls the motor 12 through the inverter 16 so that the regenerative brake force is generated taking the account of the vehicle speed, the battery charging state and the like, and outputs an actual regenerative execution value to the brake ECU 60. Accordingly, when the brake manipulation is done and when the target regenerative brake force is larger than zero, the regenerative brake force is added to the base hydraulic brake force to be applied to the wheels FL, FR, RL, RR. The regenerative cooperative control is executed in this way, and at this time, the base hydraulic brake force and the regenerative brake force are in dependence on the brake manipulation state, one example of which is shown in FIG. 6. FIG. 6 shows the correlation between the brake manipulation forces at the time of the regenerative cooperative control and the brake force indicating the sum of the base hydraulic brake force and the regenerative brake force.

That is, according to the master cylinder 23 in the present first embodiment, at the time of the non-quick stepping of the brake pedal 21, the base hydraulic brake force is restricted from being generated to become the predetermined value or less for the period that the brake manipulation state moves from the stepping-on start state being the state at the time of stepping-on start point of time to the predetermined state. Thus, when the driver steps on the brake pedal 21, as indicated by the broken line in FIG. 6, the base hydraulic brake force is forcibly restricted to the predetermined value or less between the stepping-on start state and the predetermined state, and thus, the regenerative brake force only is applied in dependence on the brake manipulation state. Further, when the brake manipulation state becomes the predetermined state, the restriction on the generation of the base hydraulic brake force is released, and the regenerative brake device A generates the maximum regenerative brake force, whereby the maximum regenerative brake force only is applied. Further, when the brake manipulation state moves to a further stepping-on state beyond the predetermined state, the restriction on the generation of the base hydraulic brake force is kept to have been released, and by the cooperative operation between the hydraulic brake device B and the regenerative brake device A, the vehicle brake force corresponding to the brake manipulation state is applied based on the base hydraulic brake force and the regenerative brake force (basically, being the maximum regenerative brake force).

On the other hand, at the time of the quick stepping of the brake pedal 21, the base hydraulic brake force is not restricted in generation, and as indicated by the solid line in FIG. 6, the base hydraulic brake force is applied from the stepping-on start point of time.

The brake ECU 60 detects the fluctuation of the regenerative brake force actually generated by the regenerative brake device A (steps 110-114). Specifically, the brake ECU 60 inputs thereto an actual regenerative execution value indicating an actual regenerative brake force that the regenerative brake device A has actually applied to the wheels FL, FR, RL, RR in response to the target regenerative brake force having been calculated at step 104 (step 110), calculates the difference between the target regenerative brake force having been calculated at step 104 and the actual regenerative brake force inputted at step 110 (step 112), and, if the calculated difference is larger than a predetermined value a, detects that the regenerative brake force has fluctuated (step 114).

Then, when detecting the fluctuation in the regenerative brake force, the brake ECU 60 judges as YES at step 114, builds a controlled hydraulic pressure by driving the pumps 37, 47 and controlling the hydraulic control valves 31, 41 in the hydraulic brake device B, and compensates for the deficiency in the brake force caused by the fluctuation in the regenerative brake force detected as described above (step 116) by applying a controlled hydraulic brake force based on the controlled hydraulic pressure to the wheels FL, FR, RL, RR. Specifically, the brake ECU 60 controls the controlled hydraulic pressure so that the same becomes a hydraulic pressure that corresponds to the difference between the target brake force calculated at step 104 and the actual regenerative brake force inputted at step 110, that is, to the difference calculated at step 112. The brake ECU 60 drives the pumps 37, 47 by starting the motor M and applies electric current to the linear solenoids of the differential pressure control valves 31, 41 so that the hydraulic pressure of the brake fluid supplied from the pumps 37, 47 to the wheel cylinders WC1, WC2, WC3, WC4 becomes the controlled hydraulic pressure. At the time, it is preferable that the linear solenoids be subjected to a feedback control so that the hydraulic pressure in the wheel cylinders WC1, WC2, WC3, WC4 detected by hydraulic pressure sensors becomes the controlled hydraulic pressure. When not detecting the fluctuation in the regenerative brake force, on the other hand, the brake ECU 60 judges as NO at step 114 and discontinues the control of the brake actuator 25 (step 118).

As clear from the aforementioned description, according to the present first embodiment, at the time of the non-quick stepping of the brake pedal 21, the flow of the brake fluid from the master cylinder 23 to the reservoir tank 24 is not restricted by the orifice 23$h$1 provided in the first port 23$h$ (port). Thus, the generation of the base hydraulic brake force is restricted until the closing end of the first piston 23$b$ moves from the first position to the second position. Therefore, when the driver steps on the brake pedal 21 to make the closing end of the first piston 23$b$ reside between the first position to the second position, the base hydraulic brake force is forcibly restricted to the predetermined value or less. Further, during this time, through the cooperative operation with the hydraulic brake device B to attain the vehicle brake force corresponding to the brake manipulation state, the regenerative brake device A compensates for the deficiency in the base hydraulic brake force relative to the vehicle brake force by the regenerative brake force.

In detail, where the second position is provided based on the maximum regenerative brake force that the regenerative brake device A is able to generate, the vehicle brake force corresponding to the manipulation state of the brake pedal 21 is applied to the vehicle only by the regenerative brake force generated by the regenerative brake device A when the closing end of the first piston 23$b$ is between the first position and the second position, the vehicle brake force corresponding to the manipulation state of the brake pedal 21 is applied to the vehicle by the maximum regenerative brake force being able to be generated by the regenerative brake device A when the closing end of the first piston 23$b$ resides at the second position, and the vehicle brake force corresponding to the manipulation state of the brake pedal 21 is applied to the vehicle by the base hydraulic brake force generated by the hydraulic brake device B and the regenerative brake force generated by the regenerative brake device A when the closing end of the first piston 23$b$ resides at a position beyond the second position.

Accordingly, in the low pedal pressure area wherein the closing end of the first piston 23$b$ resides from the first position to the second position, it results that the regenerative brake force is positively utilized, so that it is possible to attain high regenerative efficiency, namely, high fuel efficiency.

At the time of the quick stepping of the brake pedal 21, on the other hand, the flow of the brake fluid from the master cylinder 23 to the reservoir tank 24 is restricted by the orifice 23$h$1 provided in the first port 23$h$ (port). Thus, since the back pressure is increased and this causes a base hydraulic pressure to be built in the first hydraulic chamber 23$d$ (hydraulic chamber) of the master cylinder 23, a base hydraulic brake force can be generated before the first port 23$h$ is closed by the first piston 23$d$, that is, until the closing end of the first piston 23$d$ moves from the first position to the second position. Therefore, when the driver steps on the brake pedal 21 to make the closing end of the first piston 23$d$ reside between the first position and the second position, it is possible to positively generate the base hydraulic brake force. Further, during this time, through the cooperative operation with the hydraulic brake device B to attain the vehicle brake force corresponding to the brake manipulation state, the regenerative brake device A compensates for the deficiency in the base hydraulic brake force relative to the vehicle brake force by the regenerative brake force. Accordingly, in the low pedal pressure area wherein the closing end of the first piston 23b moves from the first position to the second position, the early application of the base hydraulic brake force can be realized at the time of the quick stepping of the brake pedal 21, in preference to high regenerative efficiency/high fuel efficiency.

As described above, in the vehicle brake device, in the low pedal pressure area wherein the brake pedal 21 is moved from the stepping-on start point of time to the predetermined state, the regenerative brake force is positively utilized at the time of the non-quick stepping, so that it is possible to realize the coexistence of attaining high regenerative efficiency and high fuel efficiency with applying the base hydraulic brake force as early as possible at the time of the quick stepping.

Further, the brake pedal 21 is provided with the reaction force spring 21b that builds the pedal reaction force against the brake pedal 21 until the closing end of the first piston 23b moves from the first position to the second position. The reaction force spring 21b is connected at its one end to the bracket 10a fixed on the vehicle body and urges the brake pedal 21 in the stepping-on release direction being the opposite direction to the stepping-on direction. Thus, while the brake pedal 21 is stepped on to move the closing end of the first piston 23b from the first position to the second position, a preferable pedal feeling can be applied to the driver by the urging force of the reaction force spring 21b.

In the forgoing first embodiment, the brake manipulation state may be detected by a master cylinder stroke sensor 23z that detects the stroke of the master cylinder 23.

Further, an orifice being the same as the orifice 23h may be provided in the second port 23i.

2) Second Embodiment

Next, with reference to the drawings, description will be made regarding a second embodiment in which a vehicle brake device according to the present invention is applied to a hybrid vehicle. Although the vacuum booster 22 of the aforementioned hydraulic brake device B is not provided with a brake assist device, a vacuum booster 122 of the hydraulic brake device B in the second embodiment is provided with a brake assist device. The brake assist device is a device that boosts a small stepping force to build and apply a large brake force.

Figure 8:
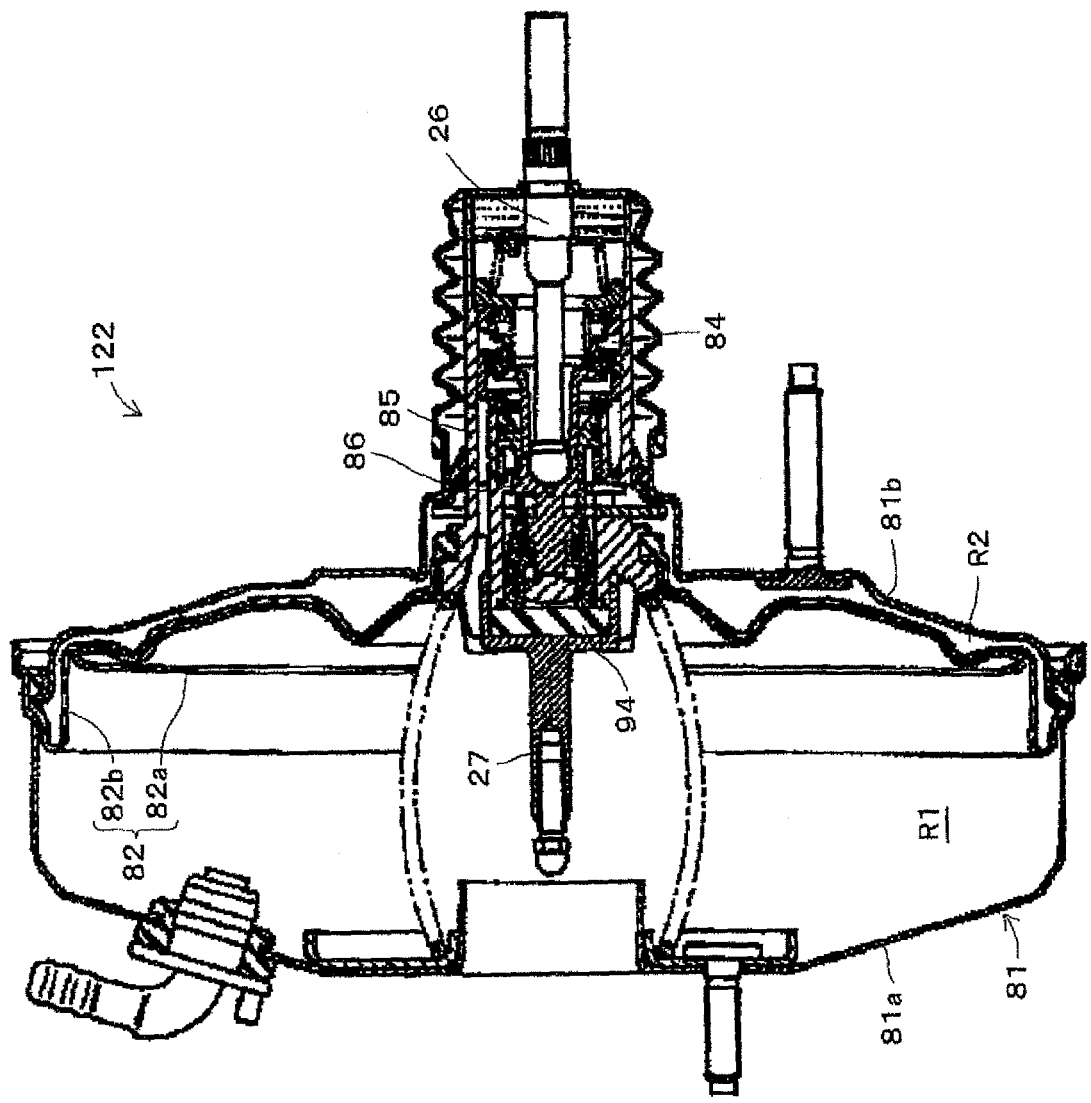
[FIG. 8] is a sectional view showing a vacuum booster in a second embodiment applying thereto a vehicle brake device according to the present invention.

In FIG. 8, the vacuum booster 122 is composed of a front shell 81a, a rear shell 81b and a movable wall 82 and is provided with a housing 81 whose interior is divided by the movable wall 82 into a constant pressure chamber R1 and a variable pressure chamber R2. The movable wall 82 in the housing 81 is composed of a metallic plate 82a and a rubber-made diaphragm 82b and is arranged to be movable in a front-rear direction in the housing 81.

The constant pressure chamber R1 is in communication with an engine intake manifold being a vacuum source and is always kept at a negative pressure during the operation of the engine. The variable pressure chamber R2 is made to communicate with, or to be blocked from, the constant pressure chamber R1 through a passage 83 and a valve mechanism 84 and is also made to communicate with, or to be blocked from, the atmosphere through the valve mechanism 84.

Figure 9:
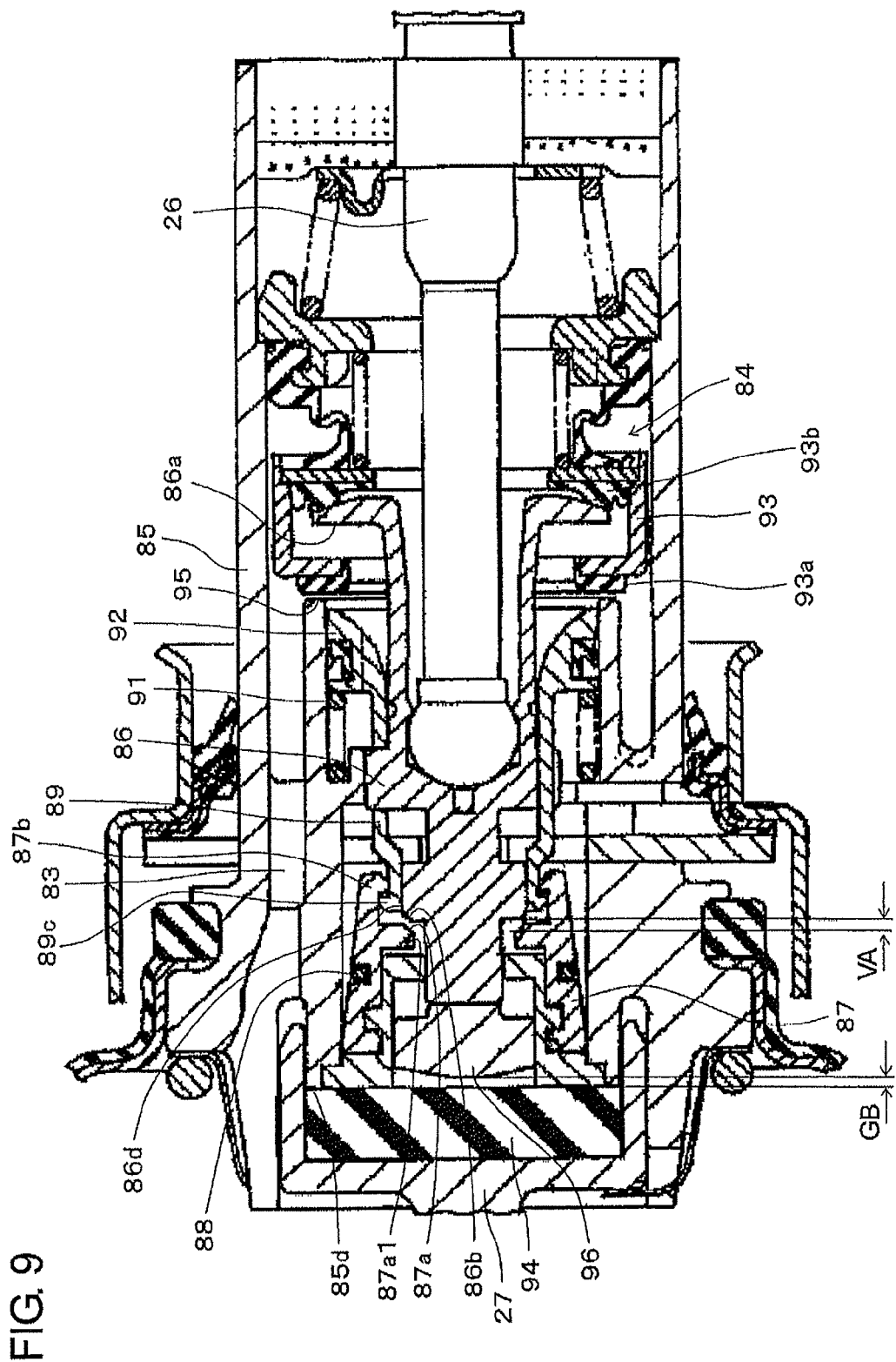
[FIG. 9] is an enlarged fragmentary sectional view of the vacuum booster shown in FIG. 8.

As shown in FIG. 9, in the vacuum booster 122, at the time of a quick stepping when the driver steps on the brake pedal 21 in a hurry, if the relative moving amount between an operating rod 26 and a power piston 85 becomes larger than a predetermined value VA, a slant portion 86b of the plunger 86 is brought into contact with taper portions 87a of holding members 87 to radially increase the diameter of the holding members 87 which are urged by a ring-like elastic member 88 to shrink in the radial direction.

When a smallest inner diameter portion 87a1 of the taper portion 87a runs on a stepped portion 86d of the plunger 86, an engaged portion 89c of a valve seat member 89 is released from engagements with engaging portions 87b of the holding members 87. Because of being urged rearward by a spring 91, the valve member 89 is moved rearward by the urging force of the spring 91 as soon as the engagement of the engaged portion 89c is released.

With the rearward movement of the value member 89, a second vacuum valve seat 92 of the valve seat member 89 is brought into contact with a valve 93a constituting of a movable portion 93 of the valve mechanism 84 to block the communication between the constant pressure chamber R1 and the variable pressure chamber R2. At this time, the plunger 86 is being moved forward bodily with the operating rod 26, while the valve seat member 89 is pushing and returning the movable portion 93 of the valve mechanism 84 rearward. Thus, an atmospheric valve seat 86a of the plunger 86 is rapidly separated from a valve 93b constituting the movable portion 93 of the valve mechanism 84, to make the variable pressure chamber R2 communicate with the atmosphere. As a result, in comparison with an ordinary braking operation, the communication and the blocking between the constant pressure chamber R1 and the variable pressure chamber R2 and the communication of the variable pressure chamber R2 with the atmosphere are performed quickly, and this substantially results in enlarging the distance between a contact surface 85d with a reaction force member 94 of the power piston 85 and a first vacuum valve seat 95 and the distance between the contact surface 85d with the reaction force member 94 of the power piston 85 and the atmospheric valve seat 86a. Therefore, it is possible to make the output in a jumping state larger than that in the ordinary state.

The urgent braking characteristic of the vacuum booster in the present embodiment is attained by changing the jumping characteristic to apply to the output member a larger propelling force than that at the time of the ordinary braking. In order to change the jumping characteristic, in FIG. 9, it can be done to increase a gap GB between a contact member 96 and the reaction force member 94. The increase in the gap GB has the same result as increasing the distance between the contact surface 85d with the reaction force member 94 of the power piston 85 and the first vacuum valve seat 95 and the distance between the contact surface 85d with the reaction force member 94 of the power piston 85 and the atmospheric valve seat 86a. That is, by moving the vacuum valve seat 92 and the atmospheric valve seat 86a rearward, the gap GB is increased to increase the output that is produced until the contact member 96 comes to receive a reaction force from the reaction force member 94, whereby the output in a so-called jumping state that the ratio of the output to the input becomes infinitely larger is made to be larger than that in the ordinary state.

Figure 10:
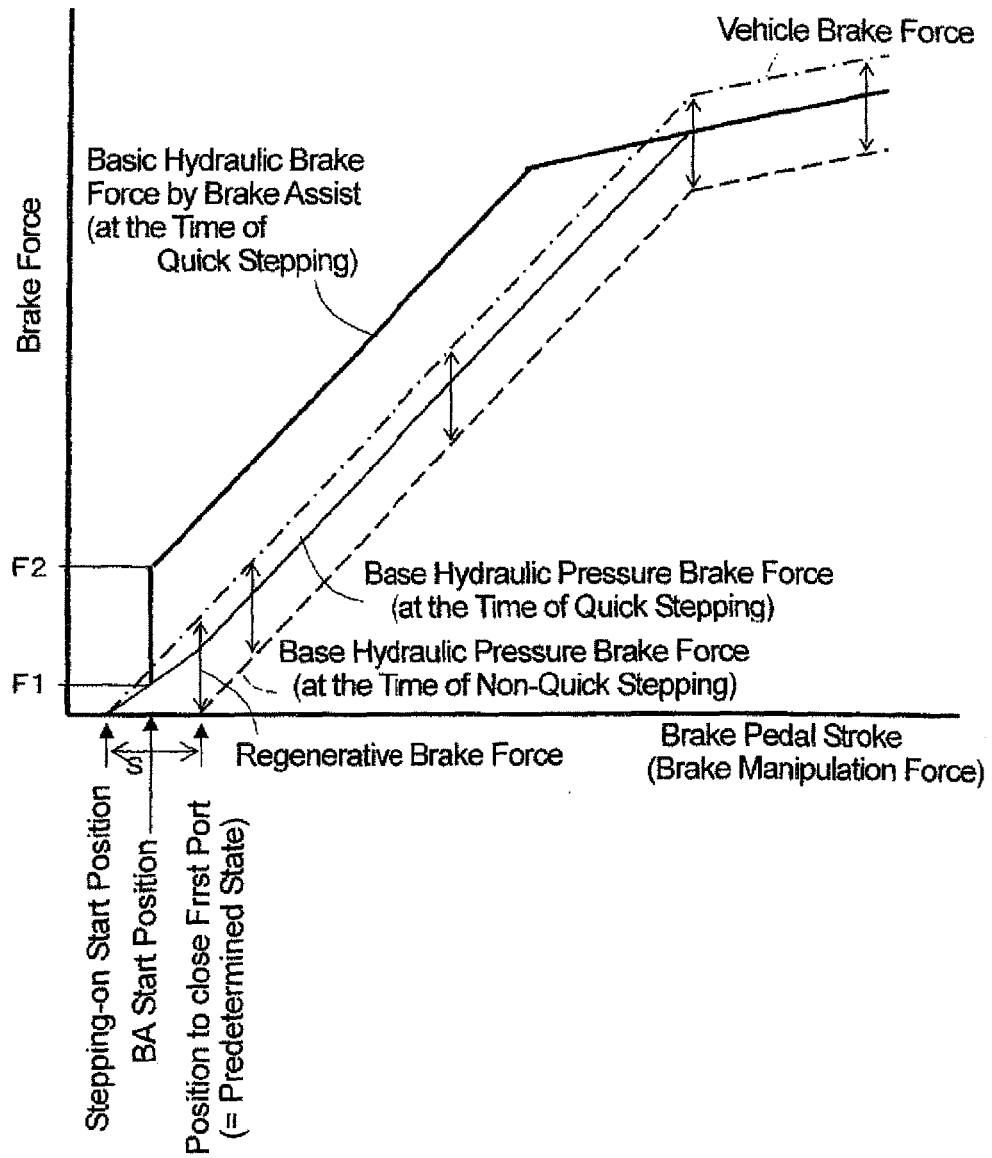
[FIG. 10] is a correlation graph between brake manipulation forces and brake forces in the second embodiment applying thereto the vehicle brake device according to the present invention.

FIG. 10 indicates the ordinary braking characteristic and the aforementioned urgent braking characteristic. In FIG. 10, the jumping in the ordinary braking results in obtaining an output only of F1 in magnitude, while the jumping in the urgent braking results in increasing the output to F2, so that it is possible to generate a brake hydraulic pressure being sufficiently large in magnitude by a small pedal stepping force.

In the vacuum booster according to the present second embodiment, the brake assist is started within the period that the operating rod 26 moves from the stepping-on start position to the contact position. Further, in a third embodiment referred later, the brake assist device is constructed to start, at the time of a quick stepping of the brake pedal, the brake assist within the period that the brake pedal is moved from the stepping-on start by a predetermined distance in the pressure increasing direction.

As clear from the foregoing description, according to the present second embodiment, at the time of the non-quick stepping of the brake pedal 21, the flow of the brake fluid from the master cylinder 23 to the reservoir tank 24 is not restricted by the orifice 23h1 provided in the first port 23h (port). Consequently, it is possible to obtain the same operation/effects as those in the aforementioned first embodiment.

At the time of the quick stepping of the brake pedal 21, on the other hand, the flow of the brake fluid from the master cylinder 23 to the reservoir tank 24 is restricted by the orifice 23h1 provided in the first port 23h (port). Thus, as the back pressure is increased, a base hydraulic pressure is built in the first hydraulic chamber 23d (hydraulic chamber) of the master cylinder 23. That is, it is possible to generate a base hydraulic brake force while the operating rod 26 moves from the stepping-on start position to the contact position. Consequently, when the driver quickly steps on the brake pedal 21, it is possible to positively generate a base hydraulic brake force with the first operating rod 26a residing between the stepping-on start position and the contact position.

The base hydraulic brake force by the base hydraulic pressure built by the hydraulic brake device B becomes the thick solid line in FIG. 10. That is, when the brake pedal stroke resides between the stepping-on start position and a brake assist start position (hereinafter referred to as BA start position) where the brake assist begins, the base hydraulic pressure is generated in dependence on the pedal stroke without being restricted in generation, similarly to the base hydraulic brake force at the time of the quick stepping in the first embodiment. Furthermore, when the brake pedal stroke resides at a position beyond the BA start position, the base hydraulic brake force by the brake assist device is applied in dependence on the brake pedal stroke.

As described above, in the vehicle brake device, in the low pedal pressure area that extends from the stepping-on start point of time of the brake pedal 21 to the predetermined state, it is possible to attain high regenerative efficiency and high fuel efficiency by positively utilizing the regenerative brake force at the time of the non-quick stepping and to apply a relatively large base hydraulic brake force by the brake assist device early and reliably at the time of the quick stepping.

In the foregoing second embodiment, the brake assist device is constructed as a so-called mechanical brake assist. Alternatively, there may be additionally provided an atmospheric pressure valve constituted by an electromagnetic valve, and this valve may be controlled to be opened and closed. Further, the brake assist device may be constructed by the brake actuator 25 which is able to generate the controlled hydraulic pressure. In this case, it is preferable to provide the hydraulic brake device B with an accumulator that is able to accumulate brake fluid of a high pressure. In this way, it is possible to early apply the controlled hydraulic pressure of the high pressure.

3) Third Embodiment

Next, with reference to FIG. 11, description will be made regarding a third embodiment in which a vehicle brake device according to the present invention is applied to a hybrid vehicle. Although in the foregoing first and second embodiments, the orifice 23h1 is provided on the master cylinder 23 side, the orifice is provided on the piston side in the third embodiment. The same components as those in the master cylinder 23 in the first embodiment have the same reference numerals put thereon, and description of the same components will be omitted.

Figure 11:
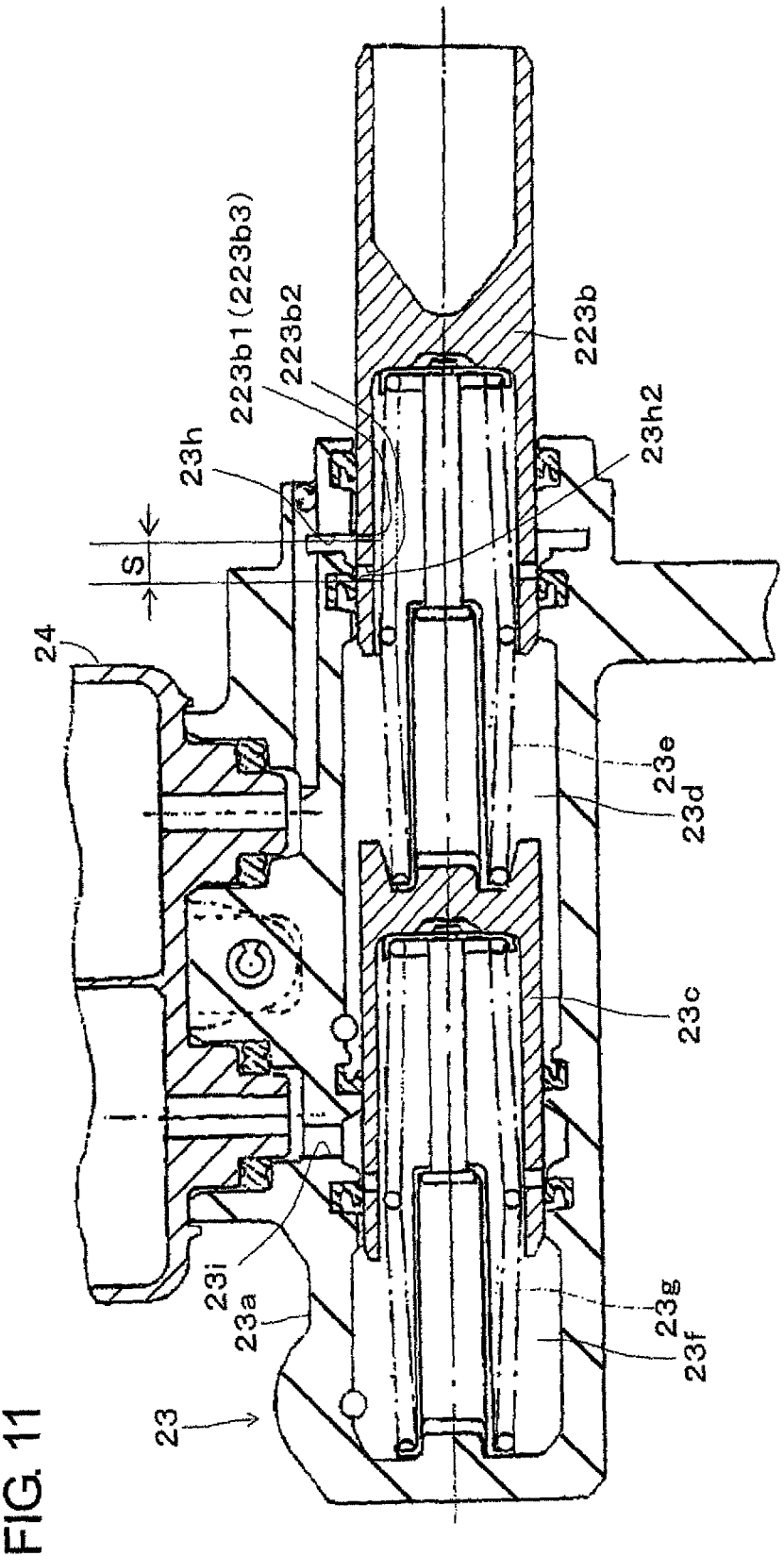
[FIG. 11] is a sectional view of a master cylinder in a third embodiment applying thereto a vehicle brake device according to the present invention.

Specifically, as shown in FIG. 11, a first piston 223b is formed with a first piston-side port 223b1 and a second piston-side port 223b2. The first piston 223b takes a bottomed cylindrical shape (cup shape). The first piston 223b opens to the first hydraulic chamber 23d on an opening portion side (opens toward the second piston 23c), and is in contact with the push rod 27 at an outside wall surface of the bottomed portion. The first piston-side port 223b1 and the second piston-side port 223b2 are arranged to face on the first port 23h (the master cylinder-side port) formed in the master cylinder 23 before the stepping-on of the brake pedal 21 begins (refer to FIG. 11). Thus, the reservoir tank 24 is made to communicate with the first hydraulic chamber 23d through the first port 23h, the first piston-side port 223b1 and the second piston-side port 223b2. In FIG. 11, the brake pedal 21 is in the stepping-on start state, and the first piston 223b resides at the first position where it is in the stepping-on start state.

The first piston-side port 223b1 is provided at a position that is separated from the closing end 23h2 of the first port 23h by the predetermined state S in the pressure reducing direction of the first piston 223b (in the rightward direction in FIG. 11).

Further, an orifice 223b3 is provided in the first piston-side port 223b1. The orifice 223b3 is set to restrict the flow of brake fluid from the master cylinder 23 to the reservoir tank 24 at the time of the quick stepping of the brake pedal 21 but not to restrict to the flow of brake fluid at the time of the non-quick stepping. The inner diameter of the orifice 223b3 is set to be smaller in diameter than the inner-diameter of the third port. Further, the first hydraulic chamber 23d is formed with a port (not shown) that like the third port 23j, communicates with an oil passage constituting the rear wheel system, and the second hydraulic chamber 23f is formed with a port (not shown) like the fourth port 23k, communicates with an oil passage constituting the front wheel system.

The second piston-side port 223b2 is provided to be separated from the first piston-side port 223b1 by the predetermined distance S in the pressure increasing direction of the first piston 223b (in the leftward direction in FIG. 11). Further, when the first piston 223b is at the first position, the second piston-side port 223b2 is in alignment with a closing end 23h2 of the first port 23h and is just before being closed. Further, the inner diameter of the second piston-side port 223b2 is set to be larger than that of the first piston-side port 223b1 and is configured to hardly increase the back pressure even at the time of the quick stepping of the brake pedal 21.

Next, description will be made regarding the operation/effects of the present third embodiment. When the brake pedal 21 being not stepped on is quickly stepped on by the driver, the operating rod 26 and the push rod 27 are pushed, whereby the first piston 223b is pushed. With the stepping-on start of the brake pedal 21, the second piston-side port 223b2 begins to be closed by the closing end 23h2 of the first port 23h, and the communication between the first hydraulic chamber 23d and the reservoir tank 24 through the second piston-side port 223b2 begins to be blocked.

Furthermore, when the first piston 223b is pushed to move by a distance corresponding to the inner diameter of the second piston-side port 223b2, the second piston-side port 223b2 is closed to block the communication through the second piston-side port 223b2.

While the first piston 223b moves from the stepping-on start of the brake pedal 21 by the predetermined distance S in the pressure increasing direction, the first hydraulic chamber 23*d* is maintained in communication with the reservoir tank 24 through the first piston side port 223*b*1. That is, the first piston-side port 223*b*1 does not begin to be closed by the closing end 23*h*2 of the first port 23*h*.

Further, the flow of the brake fluid from the master cylinder 23 to the reservoir tank 24 is not restricted by the orifice 223*b*3 in the first piston side-port 223*b*1. Thus, because the brake fluid in the first hydraulic chamber 23*d* flows to the reservoir tank 24 through the first piston-side port 223*b*1, the second piston-side port 223*b*2 and the first port 23*h* without increasing the back pressure, the base hydraulic pressure is not built in the first hydraulic chamber 23*d*. The position separated from the first position by the predetermined distance S in the pressure increasing direction is the second position.

When the first piston 223*b* moves in the leftward direction of the figure by a value that is made by adding the inner diameter of the first piston side-port 223*b*1 to the predetermined distance S, that is, when the first piston 223*b* moves beyond the predetermined distance S, the first piston side-port 223*b*1 is completely closed by the closing end 23*h*2 of the first port 23*h*, and the brake fluid in the first hydraulic chamber 23*d* becomes unable to flow to the reservoir tank 24 through the first piston side-port 223*b*1 and the first port 23*h*. Therefore, the interior of the first hydraulic chamber 23*d* is brought into a tightly closed state, and the base hydraulic pressure begins to be built in the first hydraulic chamber 23*d*.

The base hydraulic brake force by the base hydraulic pressure built by the master cylinder 23 in the present embodiment becomes as indicated by the broken line in FIG. 6, similarly to that in the foregoing first embodiment. That is, when the brake pedal stroke resides between the stepping-on start position and the position to close the first piston side-port 223*b*1, the base hydraulic pressure built in the first and second hydraulic chambers 23*d*, 23*f* of the master cylinder 23 is restricted to zero, and the generation of the base hydraulic brake force is also restricted to zero. Then, when the brake pedal stroke resides at a position beyond the position to close the first piston side-port 223*b*1, the aforementioned restriction on building the base hydraulic pressure is released. Since the base hydraulic pressure built in the first and second hydraulic chambers 23*d*, 23*f* becomes the pressure corresponding to the brake pedal stroke, the base hydraulic brake force also becomes the force corresponding to the brake pedal stroke. It is to be noted that the state in which the brake pedal stroke resides at the position to close first piston side-port 223*b*1 is the predetermined state and the brake manipulation state in which the base hydraulic brake force begins to increase in pressure in correspondence to the brake pedal stroke. Accordingly, as indicated by the broken line in FIG. 6, by applying the base hydraulic pressure directly to the wheel cylinders W1, W2, WC3, WC4, it is possible to make the respective driving wheels FR, FL, RR, RL generate the base hydraulic brake force corresponding to the base hydraulic pressure. The regenerative brake force is applied in the same manner as in the foregoing first embodiment.

In this way, the second position (the predetermined distance S) is set based on the maximum regenerative brake force that the regenerative brake device A is able to generate at the time of the non-quick stepping. Further, when the first piston 223*b* is between the first position and the second position, the vehicle brake force corresponding to the manipulation state of the brake pedal is applied to the vehicle only by the regenerative brake force generated by the regenerative brake device A. Further, when the first piston 223*b* is at the second position, the regenerative brake device A applies the vehicle brake force corresponding to the manipulation state of the brake pedal 21 to the vehicle by the maximum regenerative brake force. Furthermore, when the first piston 223*b* resides at a position beyond the second position, the vehicle brake force corresponding to the manipulation state of the brake pedal 21 is applied to the vehicle by the base hydraulic brake force generated by the hydraulic brake device B and the regenerative brake force generated by the regenerative brake device A.

On the other hand, when the brake pedal 21 is quickly stepped on by the driver, the operating rod 26 and the push rod 27 are pushed and thus, the first piston 223*b* is pushed. At this time, until the first piston 223*b* is pushed by the push rod 27 to move through the predetermined distance S or more in the leftward direction of the figure (in the pressure increasing direction), the first piston side-port 223*b*1 does not begin to be closed by the closing end 23*h*2 of the first port 23*h*. However, the flow of the brake fluid from the master cylinder 23 to the reservoir tank 24 is restricted by the orifice 223*b*3 in the first piston-side port 223*b*1. Therefore, since the back pressure is increased, the brake fluid in the first hydraulic chamber 23*d* is restrained from flowing to the reservoir tank 24 through the first piston side-port 223*b*1 and the first port 23*h*. Thus, the base hydraulic pressure is generated in the first hydraulic chamber 23*d*. Accordingly, when the driver quickly steps on the brake pedal 21, it is possible to positively generate the base hydraulic brake force with the brake pedal stroke residing between the stepping-on start position and the position to close the first piston side-port 223*b*1.

Further, during this period, through the cooperative operation with the hydraulic brake device B to attain the vehicle brake force corresponding to the brake manipulation state, the regenerative brake device A compensate for the deficiency in the base hydraulic brake force relative to the vehicle brake force by the regenerative brake force. Accordingly, in the low pedal pressure area in which the brake pedal stroke resides from the stepping-on start position to the position to close the first piston side-port 223*b*1, it can be realized to apply the base hydraulic brake force early at the time of the quick stepping of the brake pedal 21 in preference to high regenerative efficiency/high fuel efficiency.

Moreover, when the first piston 223*b* moves by the value that is made by adding the diameter of the first piston-side port 223*b*1 to the predetermined distance S, in the leftward direction of the figure, the first piston side-port 223*b*1 is closed by the closing end 23*h*2 of the first port 23*h*. Thus, the brake fluid in the first hydraulic chamber 23*d* completely becomes unable to flow to the reservoir tank 24 through the first port 23*h*, and the interior of the first hydraulic chamber 23*d* comes to a tightly closed state, whereby the increase amount of the base hydraulic pressure generated in the first hydraulic chamber 23*d* becomes larger.

The base hydraulic brake force by the base hydraulic pressure built by the master cylinder 23 in the present embodiment becomes as indicated by the solid line in FIG. 6, similarly to that in the aforementioned first embodiment. That is, when the brake pedal stroke resides between the stepping-on start position and the position to close the first piston side-port 223*b*1, the base hydraulic pressure generated in the first and second hydraulic chambers 23*d*, 23*f* is generated in dependence on the pedal stroke without being restricted in generation (as a result of the restriction on the generation being released). Therefore, the base hydraulic brake force also becomes the force corresponding to the brake pedal stroke. Then, when the brake pedal stroke is at a position beyond the position to close the first piston side-port 223*b*1, the base hydraulic pressure becomes the pressure corresponding to the brake pedal stroke, and hence, the base hydraulic brake force also becomes the force corresponding to the brake pedal stroke.

According to the present embodiment, at the time of the non-quick stepping of the brake pedal 21, the flow of the brake fluid from the master cylinder 23 to the reservoir tank 24 is not restricted by the orifice 223b3 provided in the first piston side-port 223b1. Thus, the generation of the base hydraulic brake force is restricted until the first piston 223b moves from the first position to the second position (while the brake pedal 21 is moved from the stepping-on start by the predetermined distance S in the pressure increasing direction). Accordingly, in the low pedal pressure area in which the first piston 223b moves from the first position to the second position, the regenerative brake force is positively utilized, similarly to the case in the first embodiment, so that it is possible to attain high regenerative efficiency, namely, high fuel efficiency.

On the other hand, at the time of the quick stepping of the brake pedal 21, the flow of the brake fluid from the master cylinder 23 to the reservoir tank 24 is restricted by the orifice 223b3 provided in the first piston-side port 223b1. Thus, the back pressure in the first piston-side port 223b1 increases, and it is possible to generate the base hydraulic brake force before the first piston side-port 223b1 is closed by the closing end 23h2 of the first port 23h, that is, while the first piston 223b moves from the first position to the second position. Accordingly, in the low pedal pressure area in which the first piston 223b moves from the first position to the second position, it can be realized to apply the base hydraulic brake force early at the time of the quick stepping of the brake pedal 21 in preference to high regenerative efficiency/high fuel efficiency, similarly to the case in the foregoing first embodiment.

As described above, in the vehicle brake device, in the low pedal pressure area in which the brake pedal 21 is moved from the stepping-on start to the predetermined state, it is possible to realize the coexistence of attaining high regenerative efficiency and high fuel efficiency by positively utilizing the regenerative brake force at the time of the non-quick stepping, with applying the base hydraulic brake force as early as possible at the time of the quick stepping.

Further, the brake pedal 21 is provided with the reaction force spring 21b that builds the pedal reaction force against the brake pedal 21 while the brake pedal 21 is moved from the stepping-on start position by the predetermined distance S in the pressure increasing direction. The reaction force spring 21b is connected to the bracket 10a fixed to the body of the vehicle at one end thereof and urges the brake pedal 21 in the stepping-on release direction being the opposed direction to the stepping-on direction. Thus, while the brake pedal 21 is moved from the stepping-on start position by the predetermined distance in the pressure increasing direction, it is possible to apply a preferable pedal feeling to the driver by the urging force of the reaction force spring 21b.

Further, the second piston in the second hydraulic chamber 23f may be configured to be the same as the first piston 223b, in which case the second piston may be formed with first and second piston-side ports similar to the first and second piston-side ports 223b1, 223b2, and the first piston-side port may be provided with an orifice similar to the orifice 223b3.

4) Fourth Embodiment

Next, with reference to FIGS. 12(a) and 12(b), description will be made regarding a fourth embodiment in which a vehicle brake device according to the present invention is applied to a hybrid vehicle. Although in the foregoing first and second embodiments, the orifice 23h1 is provided on the master cylinder 23 side, an orifice is provided on the piston side in present fourth embodiment.

Figure 12A:
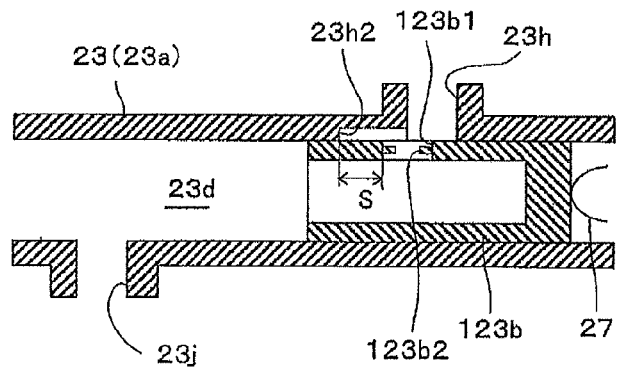
Figure 12B:
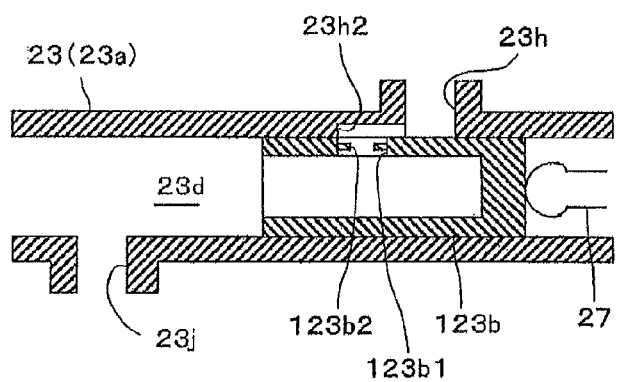

Specifically, as shown in FIGS. 12(a) and 12(b), a piston side-port 123b1 (second port) is formed in the first piston 123b. The first piston 123b takes a bottomed cylindrical shape (cup shape). The first piston 123b opens to the first hydraulic chamber 23d at an opening portion side thereof (opens toward the second piston 23c) and is in contact with the push rod 27 at an outside wall surface of the bottom portion. The piston side-port 123b1 is arranged to face on the first port 23h formed in the master cylinder 23 when the brake pedal 21 is in the stepping-on start state (refer to FIG. 12(a)). Thus, the reservoir tank 24 is able to communicate with the first hydraulic chamber 23d through the first port 23h and the piston side-port 123b1. In FIG. 12(a), the brake pedal 21 is in the stepping-on start state, and the first piston 123b is at a first position being the stepping-on start state.

The piston side-port 123b is provided at a position that, when the first piston 123b is at the first position, is separated from the closing end 23h2 of the first port 23h by the predetermined distance S in the pressure reducing direction of the first piston 123b (in the rightward direction in FIGS. 12(a) and 12(b)).

Further, an orifice 123b2 is provided in the piston-side port 123b1. The orifice 123b2 is configured to restrict the flow of the brake fluid from the master cylinder 23 to the reservoir tank 24 at the time of a quick stepping of the brake pedal 21 but not to restrict the flow of the brake fluid at the time of a non-quick stepping. The inner diameter of the orifice 123b2 is set to be smaller in diameter than that of the third port 23j. Further, the first spring 23e and the second piston 23c are omitted in FIG. 12.

Next, the operation/effects of the fourth embodiment will be described. When the brake pedal 21 being in the non-stepping state is quickly stepped on by the driver, the operating rod 26 and the push rod 27 are pushed, and hence, the first piston 123b is pushed. At this time, until the first piston 123b being at the first position is pushed by the push rod 27 to move through the predetermined distance S (being the same as the predetermined distance S in the foregoing first embodiment) or more in the leftward direction of the figure (in the pressure increasing direction), the piston-side port 123b1 does not begin to be closed by the closing end 23h2 of the first port 23h. Further, the flow of the brake fluid from the master cylinder 23 to the reservoir tank 24 is not restricted by the orifice 123b2 in the piston-side port 123b1. As a result, the brake fluid in the first hydraulic chamber 23d does not rise in the back pressure and flows to the reservoir tank 24 through the piston-side port 123b1 and the first port 23h, whereby the base hydraulic pressure is not built in the first hydraulic chamber 23d. The position separated from the first position by the predetermined distance S in the pressure increasing direction is the second position (refer to FIG. 12(b)).

When the first piston 123b is moved by a value that is made by adding the diameter of the piston-side port 123b1 to the predetermined distance S, in the leftward direction of the figure, the piston-side port 123b1 is completely closed by the closing end 23h2 of the first port 23h, and the brake fluid in the first hydraulic chamber 23d becomes unable to flow to the reservoir tank 24 through the piston-side port 123b1 and the first port 23h. Thus, the interior of the first hydraulic chamber 23d comes to a tightly closed state, and the base hydraulic pressure begins to be built in the first hydraulic chamber 23d.

The base hydraulic brake force by the base hydraulic pressure built by the master cylinder 23 in the present embodiment becomes as indicated by the broken line in FIG. 6, similarly to that in the foregoing first embodiment. That is, when the brake pedal stroke resides between the stepping-on start position and a position to close the piston-side port 123*b*1, the base hydraulic pressure generated in the first and second hydraulic chambers 23*d*, 23*f* of the master cylinder 23 is restricted to zero, and hence, the generation of the base hydraulic brake force is also restricted to zero. Then, when the brake pedal stroke resides at a position beyond the position to close the piston-side port 123*b*1, the aforementioned restriction on the generation of the base hydraulic pressure is released. Thus, the base hydraulic pressure generated in the first and second hydraulic chambers 23*d*, 23*f* becomes the pressure corresponding to the brake pedal stroke, and hence, the base hydraulic brake force also becomes the force corresponding to the brake pedal stroke. It is to be noted that the state in which the brake pedal stroke resides at the position to close the piston-side port 123*b*1 is the predetermined state and the braking manipulation state in which the base hydraulic brake force begins to rise in correspondence to the brake pedal stroke. Accordingly, as indicated by the broken line in FIG. 6, by applying the base hydraulic pressure directly to the wheel cylinders WC1, WC2, WC3, WC, it is possible to make the respective wheels FR, FL, RR, RL generate the base hydraulic brake force corresponding to the base hydraulic pressure. The regenerative brake force is applied in the same manner as in the foregoing first embodiment.

Like this, the second position (the predetermined distance S) is set based on the maximum regenerative brake force that the regenerative brake device A is able to generate at the time of the non-quick stepping. Further, when the first piston 123*b* is at between the first position and the second position, the vehicle brake force corresponding to the manipulation state of the brake pedal is applied to the vehicle only by the regenerative brake force generated by the regenerative brake device A. Further, when the first piston 123*b* resides at the second position, the vehicle brake force corresponding to the manipulation state of the brake pedal 21 is applied to the vehicle by the maximum regenerative brake force that the regenerative brake device A is able to generate. Further, when the first piston 123*b* is at a position beyond the second position, the vehicle brake force corresponding to the manipulation state of the brake pedal 21 is applied to the vehicle by the base hydraulic brake force generated by the base hydraulic brake device B and the regenerative brake force generated by the regenerative brake device A.

On the other hand, when the brake pedal 21 is quickly stepped on by the driver, the operating rod 26 and the push rod 27 are pushed, and thus, first piston 123*b* is pushed. At this time, until the first piston 123*b* is pushed by the push rod 27 to move through the predetermined distance S or more in the leftward direction of the figure (in the pressure increasing direction), the piston-side port 123*b*1 does not begin to be closed by the closing end 23*h*2 of the first port 23*h*. However, the flow of the brake fluid from the master cylinder 23 to the reservoir tank 24 is restricted by the orifice 123*b*2 in the piston-side port 123*b*1. Thus, the back pressure is increased, and the brake fluid in the first hydraulic chamber 23*d* is restrained from flowing to the reservoir tank 24 through the piston-side port 123*b*1 and the first port 23*h*. Accordingly, when the driver quickly steps on the brake pedal, it is possible to positively generate the base hydraulic brake force with the brake pedal stroke being between the stepping-on start position and the position to close the piston-side port 123*b*1.

Further, during this period, through the cooperative operation with the hydraulic brake device B to achieve the vehicle brake force corresponding to the brake manipulation state, the regenerative brake device A compensates for the deficiency in the base hydraulic brake force relative to the vehicle brake force by the regenerative brake force. Accordingly, in the low pedal pressure area in which the brake pedal stroke changes from the stepping-on start position to the position to close the piston-side port 123*b*1, it can be realized to apply the base hydraulic brake force as early as possible at the time of the quick stepping of the brake pedal 21 in preference to high regenerative efficiency/high fuel efficiency.

Furthermore, when the first piston 123*b* moves by the value that is made by adding the diameter of the piston-side port 123*b*1 to the predetermined distance S, in the leftward direction of the figure, the piston-side port 123*b*1 is completely closed by the closing end 23*h*2 of the first port 23*h*, and the brake fluid in the first hydraulic chamber 23*d* becomes unable to flow to the reservoir tank 24 through the first port 23*h*. Thus, the interior of the first hydraulic chamber 23*d* come to a tightly closed state, whereby the increase amount of the base hydraulic pressure generated in the first hydraulic chamber 23*d* becomes larger.

The base hydraulic brake force by the base hydraulic pressure built by the master cylinder 23 in the present embodiment becomes as indicated by the broken line in FIG. 6, similarly to that in the foregoing first embodiment. That is, when the brake pedal stroke resides between the stepping-on start position and the position to close the piston-side port 123*b*1, the base hydraulic pressure generated in the first and second hydraulic chambers 23*d*, 23*f* of the master cylinder 23 is not restricted in generation (the restriction on the generation is released.) and is generated in dependence on the pedal stroke. Therefore, the base hydraulic brake force also becomes the force corresponding to the brake pedal stroke. Then, when the brake pedal stroke is at a position beyond the position to close the piston-side port 123*b*1, the base hydraulic pressure also becomes the pressure corresponding to the brake pedal stroke, whereby the base hydraulic brake force also becomes the force corresponding to the brake pedal stroke.

According to the present embodiment, at the time of the non-quick stepping of the brake pedal 21, the flow of the brake fluid from the master cylinder 23 to the reservoir tank 24 is not restricted by the orifice 123*b*2 provided in the piston-side port 123*b*1 (the second port). Therefore, the generation of the base hydraulic brake force is restricted while the first piston 123*b* moves from the first position to the second position.

Specifically, where the second position is provided based on the maximum regenerative brake force that the regenerative brake device A is able to generate, the vehicle brake force corresponding to the manipulation state of the brake pedal 21 is applied to the vehicle only by the regenerative brake force generated by the regenerative brake device A when the first piston 123*b* is between the first position and the second position, the vehicle brake force corresponding to the manipulation of the brake pedal 21 is applied to the vehicle by the maximum regenerative brake force being able to be generated by the regenerative brake device A when the first piston 123*b* is at the second position, and the vehicle brake force corresponding to the manipulation state of the brake pedal 21 is applied to the vehicle by the base hydraulic brake force generated by the hydraulic brake device B and the regenerative brake force generated by the regenerative brake device A when the first piston 123*b* is at a position beyond the second position.

Accordingly, similarly to the case of the foregoing first embodiment, in the low pedal pressure area that the first piston 123*b* moves from the first position to the second position, the regenerative brake force is positively utilized, whereby it is possible to attain high regenerative efficiency, namely, high fuel efficiency.

On the other hand, at the time of the quick stepping of the brake pedal 21, the flow of the brake fluid from the master cylinder 23 to the reservoir tank 24 is restricted by the orifice 123b2 provided in the piston-side port 123 (the second port). Thus, the back pressure of the piston-side port 123b1 increases, and hence, it is possible to generate the base hydraulic brake force before the piston-side port 123b1 is closed by the closing end 23h2 of the first port 23h, that is, while the first piston 123b moves from the first position to the second position. Accordingly, similarly to the case of the foregoing first embodiment, in the low pedal pressure area that the first piston 123b moves from the first position to the second position, it can be realized to apply the base hydraulic brake force as early as possible at the time of the quick stepping of the brake pedal 21 in preference to high regenerative efficiency/high fuel efficiency.

As described above, in the vehicle brake device, in the low pedal pressure area that the brake pedal 21 is moved from the stepping-on start point of time to the predetermined state, it is possible to realize the coexistence of attaining high regenerative efficiency and high fuel efficiency by positively utilizing the regenerative brake force at the time of the non-quick stepping, with applying the base hydraulic brake force as early as possible at the time of the quick stepping.

Further, the brake pedal 21 is provided with the reaction force spring 21b that builds the pedal reaction force against the brake pedal 21 while the first piston 123b moves from the first position to the second position. The reaction force spring 21b is connected to the bracket 10a whose one end is fixed on the body of the vehicle, and urges the brake pedal 21 in the stepping-on release direction being the opposite direction to the stepping-on direction. Therefore, until the brake pedal 21 is stepped on to move the first piston 123b from the first position to the second position, it is possible to apply a preferable pedal feeling to the driver by the urging force of the reaction force spring 21b.

Further, the second piston in the second hydraulic chamber 23f may be configured to be the same as the first piston 123b, in which case a piston-side port similar to the piston-side port 123b1 may be formed in the second piston, and an orifice similar to the orifice 123b2 may be provided in the piston-side port.

5) Fifth Embodiment

Next, with reference to FIGS. 13(a) and 13(b), description will be made regarding a fifth embodiment in which a vehicle brake device according to the present invention is applied to a hybrid vehicle. Although in the first embodiment, the reaction force spring 21b is constituted by the linear spring, a reaction force spring 121b in the fifth embodiment has a non-linear characteristic.

Figure 13A:
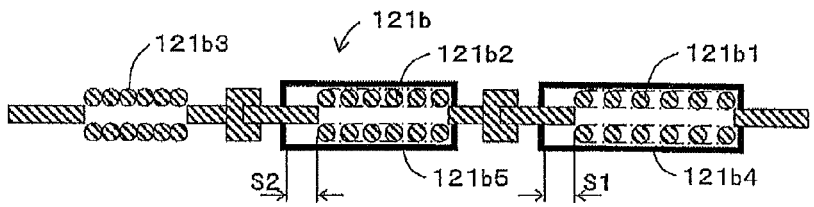
[FIGS. 13(a) and 13(b)] are views showing one example of a reaction force spring in a fifth embodiment applying thereto a vehicle brake device according to the present invention, wherein [FIG. 13(a)] is a view showing the state of being in the natural length and wherein [FIG. 13(b)] is a view showing the state of having stretched.
Figure 13B:
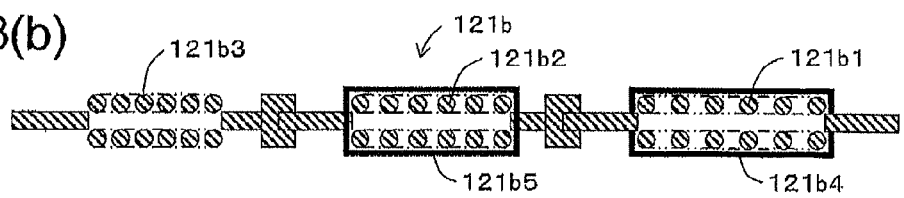

Specifically, as shown in FIGS. 13(a) and 13(b), the reaction force spring 121b is constituted by combining a plurality of linear springs. The reaction force spring 121b is composed of the plurality (three in the present embodiment) of linear springs having different spring constants. That is, the reaction force spring 121b is composed of a first spring 121b1, a second spring 121b2 and a third spring 121b3 connected in series. The spring constants are set to become larger in order of the first spring 121b1, the second spring 121b2 and the third spring 121b3. The first spring 121b1 is received in a first case 121b4 with a stretchable room of a predetermined distance S1 and, after stretching through the predetermined distance S1, is restrained by the first case 121b4 from further stretching. The second spring 121b2 is also received in a second case 121b5 with a stretchable room of a predetermined distance S2 and, after stretching through the predetermined distance S2, is restrained by the second case 121b5 from further stretching.

FIG. 13(a) shows the first spring 121b1, the second spring 121b2 and the third spring 121b3 that are in the state of being natural lengths. When a force acts on the reaction force spring 121b to stretch the same, the springs thereof begin to stretch in turn from the first spring 121b1 being smaller in spring constant. As show in FIG. 13(b), the stretch of the first spring 121b1 is restricted by the first case 121b4 and then, the stretch of the second spring 121b2 is restricted by the second case 121b5.

By the way, at the time of the non-quick stepping, a brake pedal reaction force by the master cylinder pressure cannot be obtained in the state that the master cylinder 23 and the reservoir tank 24 are in communication through the port (being the first port 23h in the first embodiment or the first port 23h, the first piston-side port 223b1 and the second piston side port 223b2 in the third embodiment). Further, generally, the characteristic of the stepping force (F-S characteristic) to the stepping amount (pedal stroke) of the brake pedal is non-linear.

Figure 15:
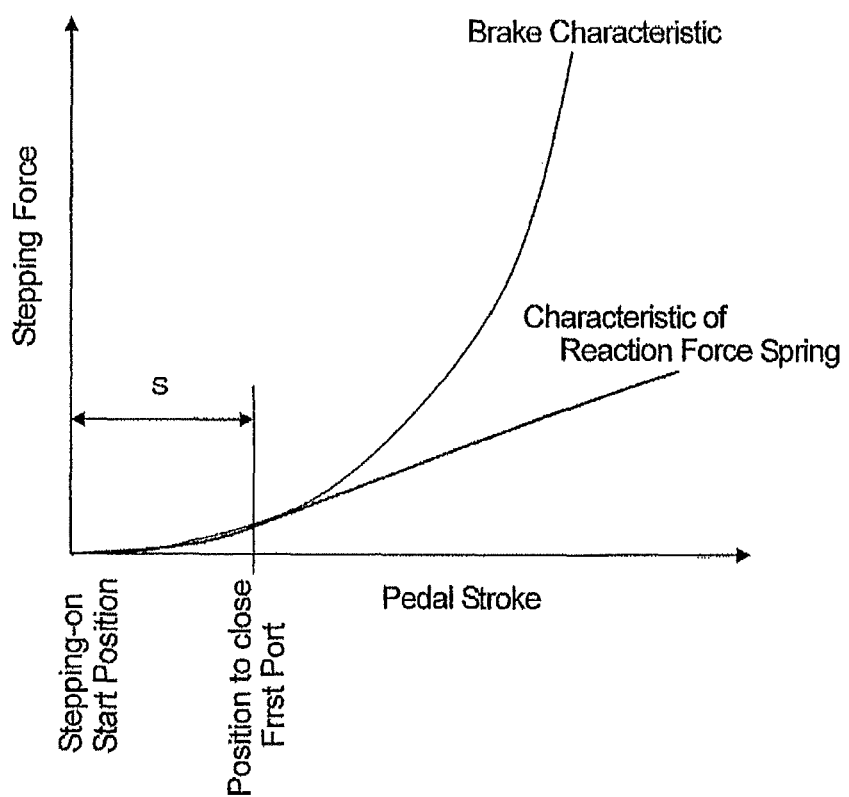
[FIG. 15] is a graph showing a pedal stroke to stepping force characteristic that represents the operation of the reaction force spring in the fifth embodiment applying thereto the vehicle brake device according to the present invention.

Therefore, according to the reaction force spring 121b constructed like this in the present embodiment, as indicated the thick solid line in FIG. 15, the characteristic of a load to the deformation of the reaction force spring 121b is set to be non-linear in the state that the master cylinder 23 and the reservoir tank 24 are in communication through the first port 23h (or the piston-side port 123b1 and the first port 23h), that is, while the pedal stroke resides between the stepping-on start position and the position to close the first port 23h. Further, a conventional characteristic (F-S characteristic) of the stepping force to the stepping amount (pedal stroke) of the brake pedal is indicated by the thin solid line. As shown in FIG. 15, the brake characteristic (F-S characteristic) is non-linear. The characteristic of the reaction force spring in the present embodiment is similar to the conventional braking characteristic between the stepping-on start position and the closing position and is linear at the closing position and a position beyond the same. Thus, it is possible to apply a further preferable pedal feeling to the driver until the brake pedal 21 is stepped on to move the first piston 23b (or the first piston 123b) from the first position to the second position (while the brake pedal 21 is moved from the stepping-on start by the predetermined distance S in the pressure increasing direction).

Figure 14A:
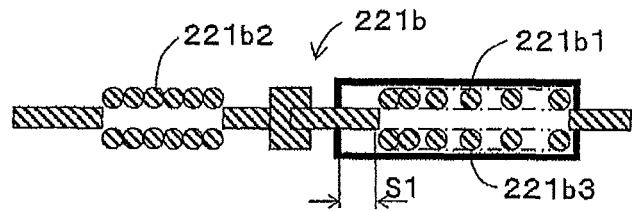
[FIGS. 14(a) and 14(b)] are views showing another example of the reaction force spring in the fifth embodiment applying thereto the vehicle brake device according to the present invention, wherein [FIG. 14(a)] is a view showing the state of being in the natural length and wherein [FIG. 14(b)] is a view showing the state of having stretched.
Figure 14B:
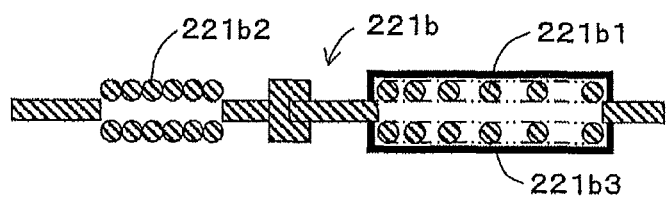

The reaction force spring 221b may be constructed by combining a linear spring and a non-linear spring, as shown in FIGS. 14(a) and 14(b).

Specifically, the reaction force spring 221b is composed of a first spring 221b1 being a non-linear spring and a second spring 221b2 being a linear spring which are connected in series. The spring constants are set to become larger in order of the first spring 221b1 and the second spring 221b2. The first spring 221b1 is received in a first case 221b3 with a stretchable room of the predetermined distance S1 and after stretching through the predetermined distance S1, is restrained from further stretching.

FIG. 14(a) shows the first spring 221b1 and the second spring 221b2 in the state of being natural lengths. When a force acts on the reaction force spring 221b to stretch the same, they begin to stretch in turn from the first spring 221b1 being small in spring constant. As shown in FIG. 14(b), the stretch of the first spring 221b1 is restricted by the first case 221b3.

6) Sixth Embodiment

Figure 16:
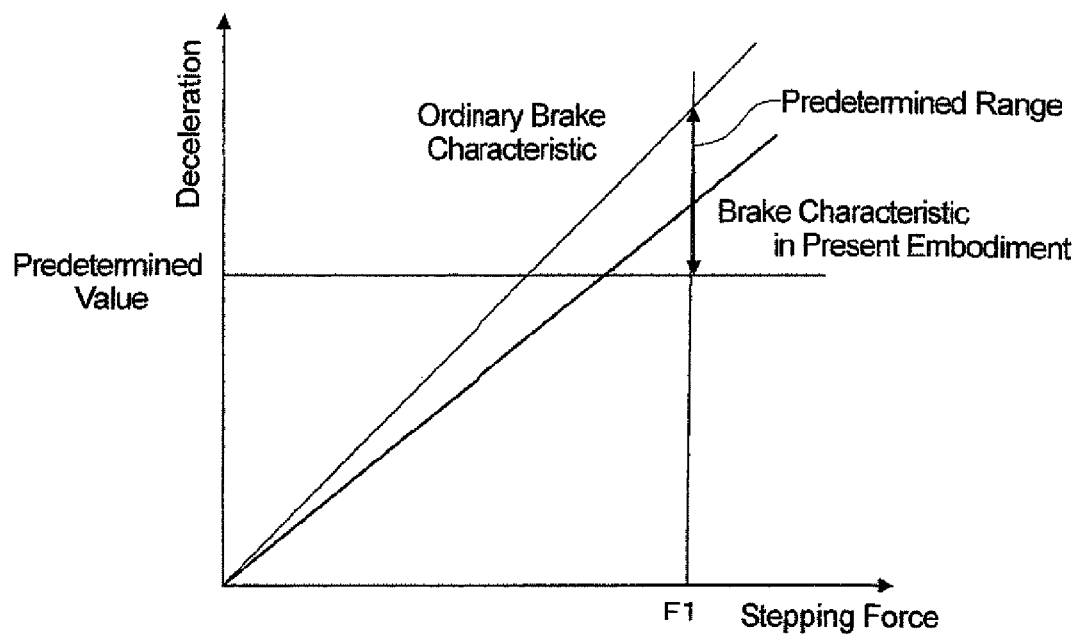
[FIG. 16] is a graph showing a stepping force to deceleration characteristic that represents the operation of a reaction force spring in a six embodiment applying thereto the vehicle brake device according to the present invention.

Furthermore, with reference to FIG. 16, description will be made regarding a sixth embodiment in which a vehicle brake device according to the present invention is applied to a hybrid vehicle. In the sixth embodiment, the characteristic of a load to the deformation of the reaction force spring 21b is linear in the state that the master cylinder 23 and the reservoir tank 24 are out of communication. The increase of load to the increase of deformation in the linear characteristic is equal to, or less than, the increase of load to the increase of deformation in the non-linear characteristic.

In general, it is preferable that the deceleration of a predetermined range (e.g. 0.25 G or higher) can be obtained by a predetermined stepping force F1 (e.g. 500N). On the other hand, the stepping force is the sum of the reaction force by the master cylinder pressure and the urging force by the reaction force spring.

Thus, according to the reaction force spring 21b in the present embodiment, the characteristic of a load to the deformation of the reaction force spring is made to be non-linear in the state that the master cylinder 23 and the reservoir tank 24 is in communication but to be linear in the state that the master cylinder 23 and the reservoir tank 24 is out of communication. As a result, the increase of load to the increase of deformation in the linear characteristic (the ordinary braking characteristic (a stepping force to deceleration characteristic) indicated by the thin solid line in FIG. 16) is set to be equal to, or less than, the increase of load to the increase of deformation in the non-linear characteristic (the brake characteristic (a stepping force to deceleration characteristic) indicated by the thick solid line in FIG. 16). Like this, it is possible to obtain the deceleration in the predetermined range by the predetermined stepping force.

Although in the foregoing respective embodiments, the brake piping system is constituted in a front-rear divided fashion, it may be constituted in an X piping fashion.

Further, in the foregoing respective embodiments, a larger one of the pedal stroke and the master cylinder pressure may be selected as the brake manipulation state to be used for control when the braking manipulation state is a predetermined state or a state subsequent to the same.

Further, although in the foregoing embodiments, the vacuum booster is used as a servo unit, the pedal stepping force acting on the brake pedal 21 may be boosted by accumulating in an accumulator the hydraulic pressure generated by a pump and by applying the hydraulic pressure to the piston.

Further, the present invention may be applicable not only a hybrid vehicle but also to a vehicle which incorporates a motor or motors only as power source and which incorporates a vehicle brake device having a master cylinder with a vacuum booster. In this case, a vacuum source becomes necessary.

INDUSTRIAL APPLICABILITY

As described above, the vehicle brake device is suitable for attaining high regenerative efficiency and high fuel efficiency by positively utilizing a regenerative brake force in a low pedal pressure area that a brake pedal is moved from a stepping-on start point of time to a predetermined state, and for applying a base hydraulic brake force as early as possible when the brake pedal is stepped on quickly.

The invention claimed is:

1. A vehicle brake device comprising:
  a hydraulic brake device that generates a base hydraulic pressure by a master cylinder in dependence on the stepping-on of a brake pedal and that applies the generated base hydraulic pressure directly to wheel cylinders of respective wheels connected to the master cylinder through oil passages provided with hydraulic control valves thereon, to make the respective wheels generate a base hydraulic brake force corresponding to the base hydraulic pressure; and
  a regenerative brake device that makes some of the wheels generate a regenerative brake force;
  wherein the hydraulic brake device and the regenerative brake device are brought into cooperative operations to apply a vehicle brake force corresponding to the manipulation state of the brake pedal, to a vehicle based on the base hydraulic brake force and the regenerative brake force; and wherein:
  the hydraulic chamber of the master cylinder is provided with a master cylinder-side port being in communication with a reservoir tank;
  a piston being slidden in the hydraulic chamber is provided with a first piston-side port facing on the master cylinder-side port and a second piston side port separated from the first piston-side port by a predetermined distance in a pressure increasing direction of the piston and facing the master cylinder-side port; wherein
  before the stepping-on of the brake pedal, the hydraulic chamber is in communication with the reservoir tank through the first piston-side port and the second piston-side port;
  with the stepping-on start of the brake pedal, the hydraulic chamber is blocked from communication with the reservoir tank through the second piston-side port;
  while the brake pedal is moved from the stepping-on start by the predetermined distance in the pressure increasing direction, the hydraulic chamber is kept to communicate with the reservoir tank through the first piston-side port;
  when the piston moves beyond the predetermined distance, the hydraulic chamber is blocked from communication with the reservoir tank through the first piston-side port and the second piston-side port; and
  the first piston-side port is provided with an orifice that is configured to restrict the flow of brake fluid from the master cylinder to the reservoir tank at the time of a quick stepping of the brake pedal but not to restrict the flow at the time of a non-quick stepping.

2. The vehicle brake device in claim 1, wherein:
  the vehicle brake device is provided with a brake assist device; and
  the brake assist device is constructed so that at the time of the quick stepping of the brake pedal, a brake assist begins within the period that the brake pedal is moved from the stepping-on start by the predetermined distance in the pressure increasing direction.

3. The vehicle brake device in claim 1, wherein:
  the brake pedal is provided with a reaction force spring that builds a pedal reaction force against the brake pedal while the brake pedal is moved from the stepping-on start by the predetermined distance in the pressure increasing direction; and
  the reaction force spring is connected to a bracket fixed to a vehicle body at its one end and urges the brake pedal in a stepping-on release direction being an opposite direction to the stepping-on direction.

4. The vehicle brake device in claim 3, wherein the characteristic of a load to a deformation of the reaction force spring is non-linear in a state that the master cylinder and the reservoir tank are in communication through the master cylinder-side port.

5. The vehicle brake device in claim 4, wherein: the characteristic of a load to the deformation of the reaction force spring is linear in a state that the master cylinder and the reservoir tank are out of communication with each other; and an increase of the load to the increase of the deformation in the linear characteristic is equal to, or less than, the increase of the load to the increase of the deformation in the non-linear characteristic.

6. A vehicle brake device comprising:

a hydraulic brake device that generates a base hydraulic pressure by a master cylinder in dependence on the stepping-on of a brake pedal and that applies the generated base hydraulic pressure directly to wheel cylinders of respective wheels connected to the master cylinder through oil passages provided with hydraulic control valves thereon, to make the respective wheels generate a base hydraulic brake force corresponding to the base hydraulic pressure; and a regenerative brake device that makes some of the wheels generate a regenerative brake force;

wherein the hydraulic brake device and the regenerative brake device are brought into cooperative operations to apply a vehicle brake force corresponding to a manipulation state of the brake pedal based on the base hydraulic brake force and the regenerative brake force; and wherein a first port and a second port are provided at a hydraulic chamber of the master cylinder and communicate with a reservoir tank, and are provided in a piston slidden in the hydraulic chamber, the second port is provided at a position that is separated from a closing end of the first port by a predetermined distance in a pressure reducing direction of the piston when the piston is at a first position placed in a stepping-on start state being a stepping-on start state of the brake pedal; and wherein the hydraulic chamber of the master cylinder is in communication with the reservoir tank through the first port and the second port while the brake pedal is stepped on to move the piston from the first position to a second position that is separated by the predetermined distance in the pressure increasing direction of the piston, and the hydraulic chamber of the master cylinder is closed against the reservoir tank when the piston is beyond the second position; and wherein the second port is provided with an orifice that is configured to restrict the flow of brake fluid from the master cylinder to the reservoir tank at the time of a quick stepping of the brake pedal but not to restrict the flow at the time of a non-quick stepping.

7. The vehicle brake device in claim 6, wherein:

the vehicle brake device is provided with a brake assist device; and the brake assist device is constructed so that at the time of the quick stepping of the brake pedal, a brake assist begins when the piston is between the first position and the second position.

8. The vehicle brake device in claim 6, wherein:

the brake pedal is provided with a reaction force spring that builds a pedal reaction force against the brake pedal while the piston moves from the first position to the second position; and the reaction force spring is connected to a bracket fixed to a vehicle body at its one end and urges the brake pedal in a stepping-on release direction being an opposite direction to the stepping-on direction.

9. The vehicle brake device in claim 8, wherein the characteristic of a load to a deformation of the reaction force spring is non-linear in a state that the master cylinder and the reservoir tank are in communication through the master cylinder-side port.

10. The vehicle brake device in claim 9, wherein:

the characteristic of a load to the deformation of the reaction force spring is linear in a state that the master cylinder and the reservoir tank are out of communication; and an increase of the load to the increase of the deformation in the linear characteristic is equal to, or less than, the increase of the load to the increase of the deformation in the non-linear characteristic.

\* \* \* \* \*